US010156439B2

(12) United States Patent
Fay et al.

(10) Patent No.: US 10,156,439 B2
(45) Date of Patent: Dec. 18, 2018

(54) INSPECTION SYSTEM FOR ALIGNMENT IN RESTRICTED VOLUMES

(71) Applicant: The Boeing Company, Chicago, IL (US)

(72) Inventors: Christopher W. Fay, Seattle, WA (US); Farshad Forouhar, Lake Forest Park, WA (US); Kevin M. Uhl, Mukilteo, WA (US); Gary Mark Buckus, Snohomish, WA (US); Eric Sean Kamila, Edmonds, WA (US); Joshua Charles Modrzynski, Edmonds, WA (US); John B. Winn, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/449,303

(22) Filed: Mar. 3, 2017

(65) Prior Publication Data
US 2018/0252519 A1 Sep. 6, 2018

(51) Int. Cl.
G01B 11/27 (2006.01)
G01M 5/00 (2006.01)

(52) U.S. Cl.
CPC ......... G01B 11/272 (2013.01); G01M 5/0016 (2013.01)

(58) Field of Classification Search
CPC .................. G01B 11/272; G01M 5/0016
USPC ........................................... 356/401
See application file for complete search history.

(56) References Cited

U.S. PATENT DOCUMENTS

| 4,809,066 A | 2/1989 | Leberl et al. | |
|---|---|---|---|
| 4,899,048 A * | 2/1990 | Shelander | G01D 5/34715 250/231.13 |
| 2005/0046846 A1 * | 3/2005 | Chandhok | G03F 7/70283 356/401 |
| 2008/0226157 A1 * | 9/2008 | Stokowski | G03F 7/705 382/144 |
| 2011/0188116 A1 * | 8/2011 | Ledentsov | G06T 19/006 359/479 |
| 2013/0188059 A1 | 7/2013 | Georgeson et al. | |
| 2016/0202620 A1 * | 7/2016 | Egashira | G03F 9/7011 438/14 |

(Continued)

FOREIGN PATENT DOCUMENTS

GB 2465672 A 6/2010
JP 2000180152 A 6/2000

OTHER PUBLICATIONS

"Laser Alignment and Position Sensing Technology", On-Track Photonics, Inc., accessed on Dec. 1, 2016, 3 pages. http://www.ontrak.com/.

(Continued)

Primary Examiner — Hina F Ayub
(74) Attorney, Agent, or Firm — Yee & Associates, P.C.

(57) ABSTRACT

An inspection system is presented. The inspection system comprises a remotely controllable imaging assembly and a scale reticle. The remotely controllable imaging assembly includes a camera and a lens system. The lens system includes a tunable-focus lens and a magnifying lens between the camera and the tunable-focus lens. The scale reticle is positioned within a sight line of the camera of the imaging assembly such that the scale reticle is between the imaging assembly and a target.

21 Claims, 19 Drawing Sheets

(56) References Cited

U.S. PATENT DOCUMENTS

2016/0212409 A1*   7/2016   Cole .................. H04N 13/0022
2017/0212057 A1*   7/2017   Janik ...................... G01N 21/94
2017/0353651 A1*  12/2017   Matsuda ............ H04N 5/23203

OTHER PUBLICATIONS

Dyson et al., "The 747-400 Dreamlifter—Swing Tail Door Alignment and Latch Mechanism", The Boeing Company, SAE Aerospace Paper No. 2008-08-FAS-0007, 2008, 22 pages.

Poechlauer et al., "The 747-400 Dreamlifter—Swing Tail Door Alignment and Latch Mechanism", The Boeing Company, Jul. 22, 2008, 7 pages.

"Machine Vision," Optotune AG, copyright 2016, accessed on Feb. 20, 2017, 4 pages. http://http://www.optotune.com/index.php/applications/machine-vision.

Extended European Search Report, dated Jul. 4, 2018, regarding Application No. EP18158313.9, 7 pages.

\* cited by examiner

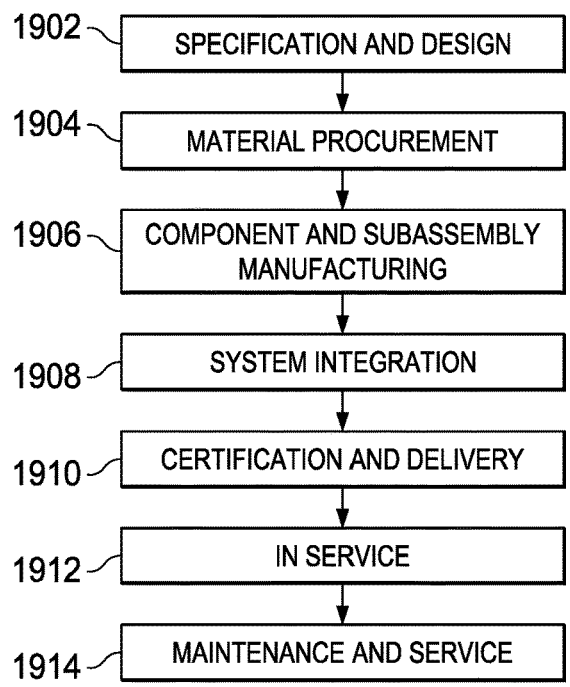
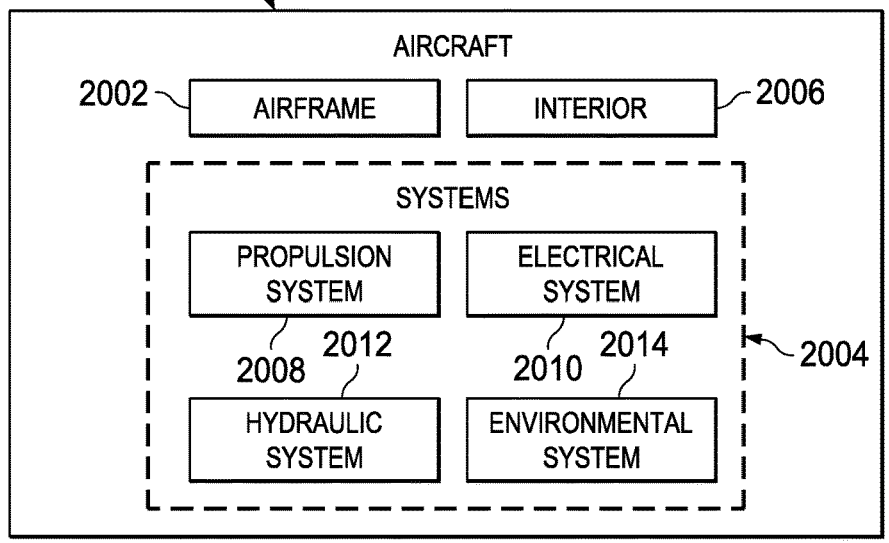

INSPECTION SYSTEM FOR ALIGNMENT IN RESTRICTED VOLUMES

BACKGROUND INFORMATION

1. Field

This disclosure relates generally to inspection systems, and more specifically, to inspection systems within a restricted volume. Still more particularly, the present disclosure relates to systems and methods for measuring an alignment of components.

2. Background

A folding wing design may be used to reduce the span of wings to fit within the limitations of an existing airport's infrastructure. A folding wing design has folding wing tips that may be folded to fit within runways, taxiways, and gate areas, and that may be extended prior to takeoff to increase wingspan.

Folding wing systems include latch pins to secure the folding wing systems in an extended position. Each latch pin desirably extends into bores within two structures, such as a clevis and a lug, to secure the folding wing system. Misalignment between the bores creates side loading in the latch pin actuator as the pin extends. Side loading on the latch pin actuator is undesirable.

To prevent or reduce misalignment, structural end stop shims are used to adjust the extended position of the wing tip for flight. However, placing and altering structural end stop shims is an iterative process. Shims are added and removed until the bores are aligned, such that a latch pin does not scrape undesirably against the bores.

Therefore, it would be desirable to have a method and apparatus that take into account at least some of the issues discussed above, as well as other possible issues. Specifically, one issue is to find a method and apparatus for aligning components of a folding wingtip system without trial and error adding and removing of shims.

SUMMARY

An illustrative embodiment of the present disclosure provides an inspection system. The inspection system comprises a remotely controllable imaging assembly and a scale reticle. The remotely controllable imaging assembly includes a camera and a lens system. The lens system includes a tunable-focus lens and a magnifying lens between the camera and the tunable-focus lens. The scale reticle is positioned within a sight line of the camera of the imaging assembly such that the scale reticle is between the imaging assembly and a target.

Another illustrative embodiment of the present disclosure provides an inspection system. The inspection system comprises a remotely controllable imaging assembly including a camera and a lens system. The imaging assembly is configured to take an image of a target at a first focal plane of the lens system and take a second image of a reticle at a second focal plane of the lens system. The imaging assembly is configured such that the second image of the scale reticle has a resolution of 0.001 inch when the scale reticle is between approximately 0.5 inches and approximately 6 inches from the imaging assembly and the reticle is up to an inch away from the target.

A further illustrative embodiment of the present disclosure provides a method. An imaging assembly is attached to a component. A reticle of the inspection system is positioned within a sight line of the camera, such that the reticle is between the imaging assembly and a target. A first image of the target is taken at a first focal plane of the lens system. A second image of the reticle is taken at a second focal plane of the lens system. An alignment of the target is measured relative to the reticle using the first image and the second image.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 19 is an illustration of a block diagram of an aircraft manufacturing and service method in accordance with an illustrative embodiment; and FIG. 20 is an illustration of a block diagram of an aircraft in which an illustrative embodiment may be implemented.

DETAILED DESCRIPTION

Figure 1:
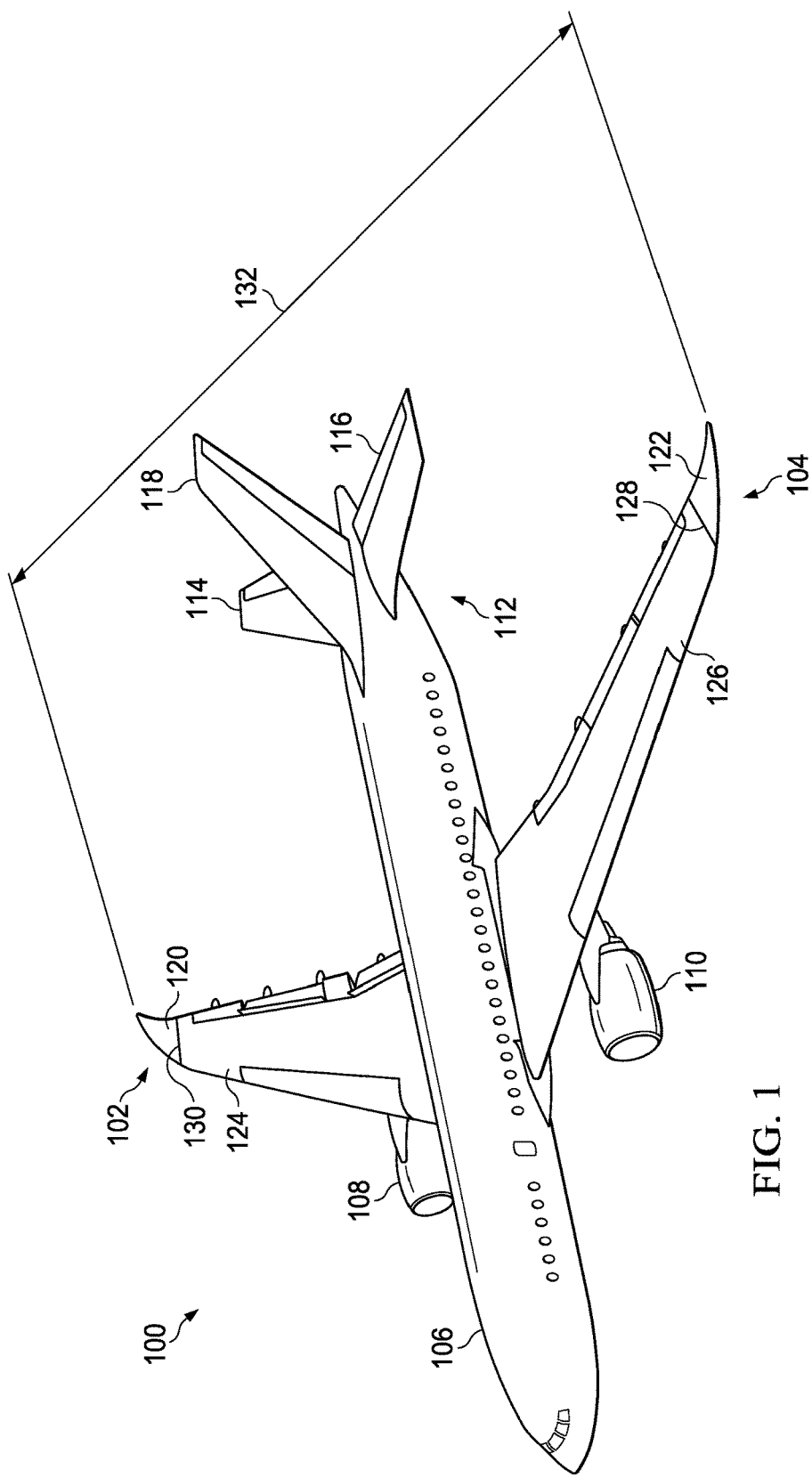
FIG. 1 is an illustration of an aircraft having a folding wing system in accordance with an illustrative embodiment.

The illustrative embodiments recognize and take into account one or more different considerations. For example, the illustrative embodiments recognize and take into account that an aircraft may benefit from a long wingspan in flight while being able to reduce the wingspan when operating at an airport. The illustrative embodiments recognize and take into account that folding wing tip assemblies may be desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include increased fuel efficiency.

The illustrative embodiments recognize and take into account that several designs of a folding wing tip (FWT) assembly use four pin and bushing sets to lock the folding wing tip (FWT) in ready-for-flight condition prior to takeoff. The illustrative embodiments recognize and take into account that the alignment of each individual pin to each individual bushing is critical for desirable latch or unlatch performance and load transfer during flight. The illustrative embodiments also recognize and take into account that having desired alignment of each pin may increase actuator life or decrease maintenance frequency. The illustrative embodiments recognize and take into account that each individual pin/bushing set uses individually measured, fitted and installed shims to assure proper pin-to-bushing alignment during operation. The illustrative embodiments recognize and take into account that four sets of pin/bushing fittings are not in single bore alignment and do not have a single visible line of sight. The illustrative embodiments further recognize and take into account that the four sets of pin/bushing fittings require precise measurements in the transverse axes at different focal planes located along the longitudinal sight axis. The illustrative embodiments allow simultaneous measurement of initial pin-to-bushing bore alignment, and measurement of desired shim thickness.

The illustrative embodiments recognize and take into account that existing methods of alignment include mechanical fit checks, using a borescope, using a camera, or using laser-line and sensor systems. The illustrative embodiments recognize and take into account that each of these methods may be at least one of undesirably expensive, time-consuming, or difficult to implement.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

The illustrative embodiments recognize and take into account that mechanical fit checks use metal bluing to show where pin-and-bushing interferences occur, then trial and error shim fitting to reduce said interferences. The illustrative embodiments recognize and take into account that after using a borescope to acquire a single image at a time, an operator uses his own judgment to determine proper shim size for the bushing or pin housings. The illustrative embodiments recognize and take into account that laser-line and sensor systems may be difficult or impossible to install and use on pin-and-bushing alignment systems which use cycling during alignment checks.

The illustrative embodiments recognize and take into account that a camera and target system with a manually adjusted lens to focus at several distances on intermediate and far distance targets may use extra operator precautions when preloading is present. Accordingly, a manually adjusted lens may be undesirable when preloading is present. The illustrative embodiments recognize and take into account that a camera and target system without a remotely adjusted lens may provide protection for the operator from preloading. The illustrative embodiments recognize and take into account that the safety of a manufacturing environment may be increased through the use of a camera and target system with a remotely adjusted lens.

The illustrative embodiments further recognize and take into account that maintenance and repair of aircraft contribute to undesirable downtime for commercial flights. Further, maintenance and repair contributes to loss of revenue for commercial flights. For example, some revenue flights may need to be canceled or delayed to perform maintenance or trouble-shooting. Thus, the illustrative embodiments recognize and take into account that reducing maintenance and trouble-shooting downtime is desirable.

The illustrative examples further recognize and take into account that other components having restricted volumes may benefit from inspection. Yet more specifically, the illustrative examples additionally recognize and take into account that other components other than folding wingtip assemblies, such as, but not limited to, doors, aircraft fuselage components, or other large hinged structures may benefit from alignment inspection and quantifiable shimming or other modifications.

The illustrative embodiments present a machine-vision based system enabling simultaneous alignment or adjustment of one or multiple bearing or bushing-and-pin sets in areas of restricted access. The system consists of one or multiple imaging devices, such as controllable-focus digital cameras controlled remotely, that can sequentially focus on a series of alignment targets and reticles located at different focal lengths from the imaging devices. Each target and reticle is precisely positioned to the bearing or bushing-and-pin sets in question. A monitor or computer may be used to view all images simultaneously, allowing all component sets to be aligned or adjusted simultaneously.

Figure 2:
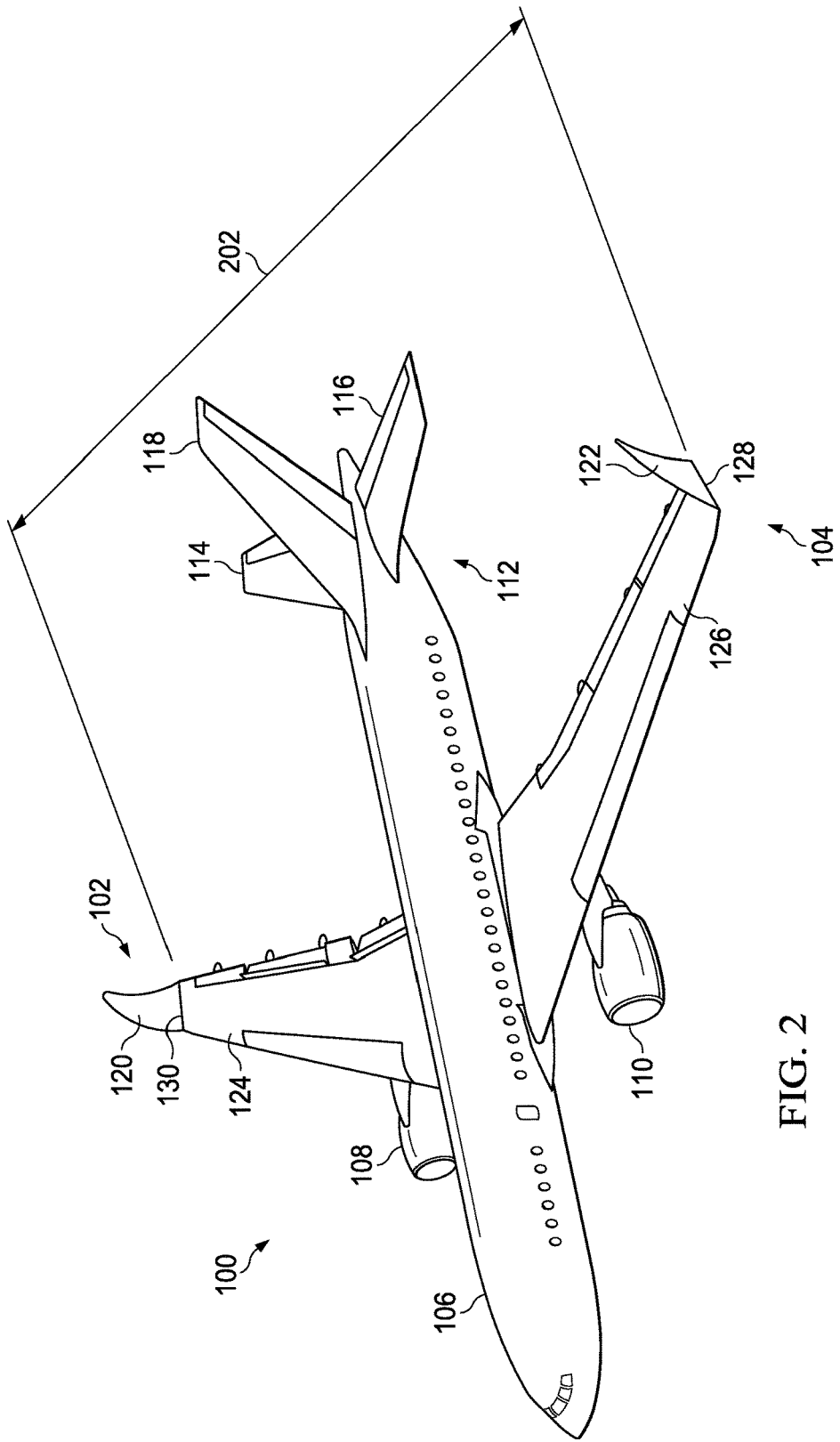
FIG. 2 is an illustration of an aircraft having a folding wing system in accordance with an illustrative embodiment.
Figure 3:
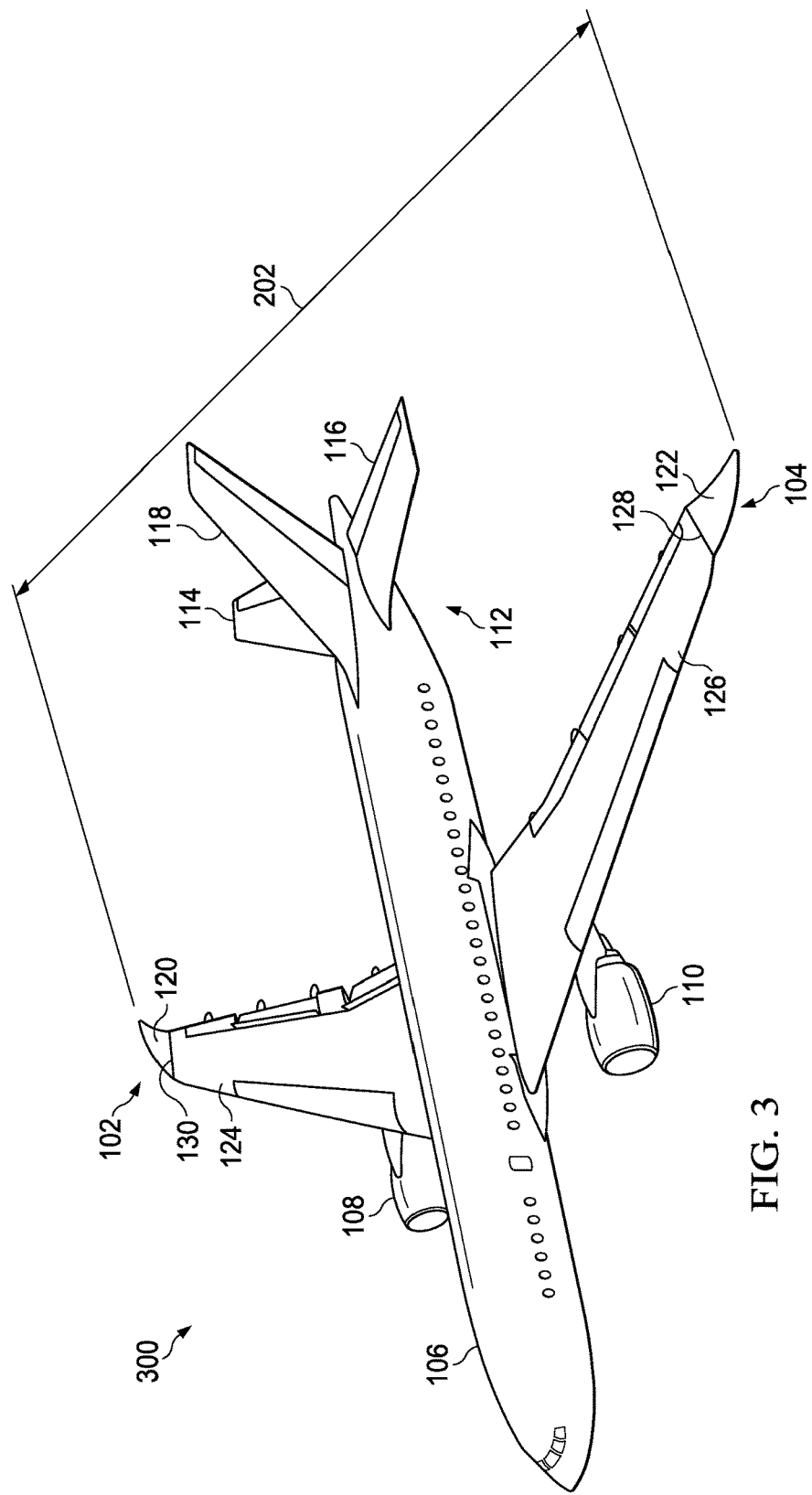
FIG. 3 is an illustration of an aircraft having a folding wing system in accordance with an illustrative embodiment.

With reference now to the figures, and in particular, with reference to FIGS. 1, 2, and 3, illustrations of an aircraft having a folding wing system is depicted in accordance with illustrative embodiments. FIG. 1 depicts aircraft 100 in a flight position, FIG. 2 depicts aircraft 100 in a taxiing or folded position, and FIG. 3 depicts aircraft 100 in a preloaded position. Reference numerals used in FIG. 1 are also used in FIGS. 2 and 3.

Aircraft 100 is an example of an aircraft in which a folding wing system may be implemented in accordance with an illustrative embodiment. In the illustrative embodiment, aircraft 100 includes wing 102 and wing 104 attached to body 106; engine 108 attached to wing 102; and engine 110 attached to wing 104.

Body 106 has tail section 112. Horizontal stabilizer 114, horizontal stabilizer 116, and vertical stabilizer 118 are attached to tail section 112 of body 106. Wing 102 includes fixed portion 124 and unfixed portion 120. Fixed portion 124 is an inboard portion of wing 102, which is fixed to body 106. Similarly, wing 104 includes fixed portion 126 and unfixed portion 122.

Wing 104 includes wing fold system 128 to move unfixed portion 122 with respect to fixed portion 126. Wing 102 includes wing fold system 130 to move unfixed portion 120 with respect to fixed portion 124. Wing fold system 128 and wing fold system 130 each include a latch assembly (not depicted in FIG. 1 or FIG. 2) in accordance with an illustrative embodiment.

FIG. 1 depicts wings 102 and wing 104 of aircraft 100 in a flight position, with wingspan 132. FIG. 2 depicts wing 102 and wing 104 of aircraft 100 in a folded position, with wingspan 202. Wingspan 202 is less than wingspan 132.

FIG. 3 depicts wing 102 and wing 104 in a preloaded position. A preloaded position for wing 104 is one in which a load is applied to overextend unfixed portion 122 relative to fixed portion 126. A preloaded position for wing 102 is one in which a load is applied to overextend unfixed portion 120 relative to fixed portion 124. By applying a preload to a folding wing tip, the wing tip hinge is stiffened such that the bores will not "bounce" during insertion of latch pins. By applying a preload to a folding wing tip, the wing tip is restricted from additional motion in one direction by the preload and restricted from additional motion in the opposite direction by a wing stop. The amount that unfixed portion 122 or unfixed portion 120 is overextended is affected by the wing stops.

In some illustrative examples, a preloaded position for wing 102 and wing 104 may only have unfixed portion 122 and unfixed portion 120 at a small (greater than zero, but less than five degrees) angle relative to fixed portion 126 and fixed portion 124 respectively. In one illustrative example, the preloaded position for a wing is between approximately 1 degree and 2 degrees.

Aircraft 100 is an example of an aircraft in which a folding wing system is implemented in accordance with an illustrative embodiment. For example, folding wingtip assembly 404 of FIG. 4 discussed below, is implemented in at least one of wing 102 or wing 104.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Further, although inspection systems such as inspection system 434 are described to inspect folding wingtip assemblies, inspection system 434 may be used to inspect other components or other structures.

Figure 4:
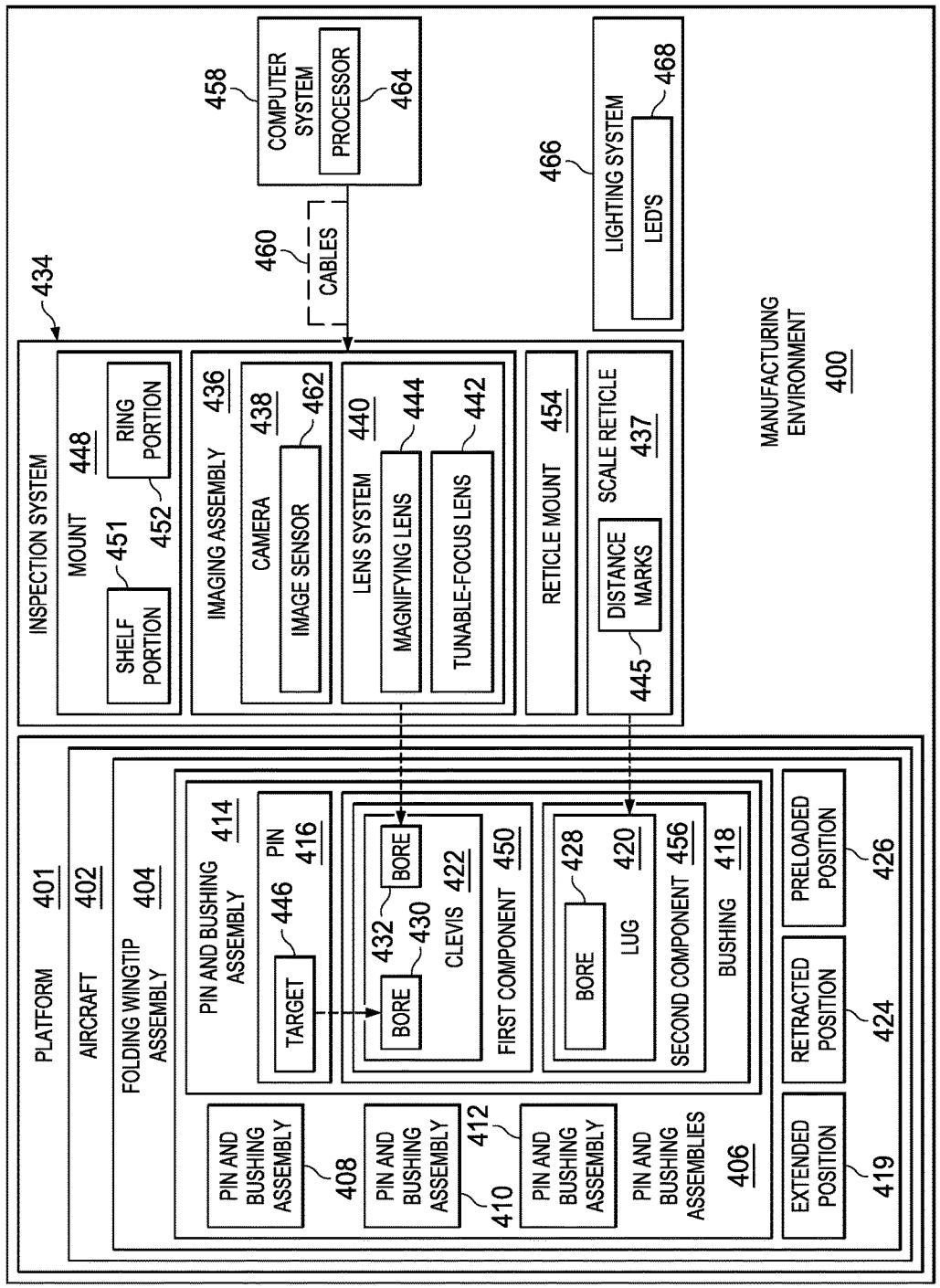
FIG. 4 is an illustration of a block diagram of a manufacturing environment in accordance with an illustrative embodiment.

Turning now to FIG. 4, an illustration of a block diagram of a manufacturing environment is depicted in accordance with an illustrative embodiment. Manufacturing environment 400 includes platform 401. Platform 401 is any desirable type of structure receiving assembly, manufacturing, or other desirable processes in manufacturing environment 400. In some illustrative examples, platform 401 takes the form of aircraft 402. Aircraft 402 may be a representation of aircraft 100 of FIGS. 1-3. Thus, manufacturing environment 400 is an example of an environment in which aircraft 100 may be manufactured or assembled.

In this illustrative example, aircraft 402 includes folding wingtip assembly 404. Folding wingtip assembly 404 is a component of at least one of wing 102 or wing 104. Folding wingtip assembly 404 includes pin and bushing assemblies 406. Pin and bushing assemblies 406 form a rotational axis for folding wingtip assembly 404. Pin and bushing assemblies 406 includes any desirable number of pin and bushing assemblies. In this illustrative example, pin and bushing assemblies 406 includes pin and bushing assembly 408, pin and bushing assembly 410, pin and bushing assembly 412, and pin and bushing assembly 414.

Components of pin and bushing assembly 414 may be representative of components of the remaining pin and bushing assemblies of pin and bushing assemblies 406. Pin and bushing assembly 414 includes pin 416 and bushing 418. Pin 416 extends through bushing 418 to hold folding wingtip assembly 404 in extended position 419. Extended position 419 is an operating position during flight.

Bushing 418 includes lug 420 and clevis 422. Lug 420 is a moving lug. In some illustrative examples, lug 420 is a component of folding wingtip assembly 404 that moves relative to clevis 422 when moving folding wingtip assembly 404 between extended position 419, retracted position 424, and preloaded position 426. Retracted position 424 may be a position for folding wingtip assembly 404 when aircraft 402 is taxiing or parked.

Folding wingtip assembly 404 is placed into preloaded position 426 when transitioning from retracted position 424 to extended position 419. Folding wingtip assembly 404 is placed into preloaded position 426 so that bore 428 of lug 420 does not bounce relative to bore 430 and bore 432 of clevis 422.

Preloaded position 426 is when the load of the wingtip is loaded into the fixed portion of the wing. An actuator is used to overextend the folding wing tip to push it into the stops in the extended position. A pre-load is an advanced load pre-applied before flight loads are applied to the wing. In preloaded position 426, a pushing action is applied to press against end stops of folding wingtip assembly 404.

In preloaded position 426, folding wingtip assembly 404 is held tight, such that folding wingtip assembly 404 doesn't move when moving pin 416. In preloaded position 426, pin 416 may be placed into or out of bore 430 and bore 428. Any desirable amount of force may be used to place folding wingtip assembly 404 into preloaded position 426. In one illustrative example, 70,000 in/lbs of torque is the load applied to folding wingtip assembly 404.

During manufacturing of aircraft 402, pin and bushing assemblies 406 are aligned. Pin and bushing assemblies 406 are aligned to reduce or prevent pin 416 from impacting clevis 422 or lug 420 when pin 416 is inserted or removed from bore 428 and bore 430.

Pin and bushing assemblies 406 are positioned in a restricted volume within folding wingtip assembly 404. Inspection system 434 is used to inspect the alignment of pin and bushing assembly 414 within the restricted volume. Inspection system 434 is configured to fit within the restricted volume within folding wingtip assembly 404.

Although this illustrative example discusses the use of inspection system 434 with reference to folding wingtip assembly 404 of aircraft 402, inspection system 434 may be used in any desirable restricted volume. Further, inspection system 434 may be used in any situation in which an inspection system 434 is desirably used remotely. Yet further, inspection system 434 may be used in any situation in which inspection system 434 meets the technical inspection requirements, such as resolution, magnification, distance to target, or any other inspection standards.

Inspection system 434 comprises remotely controllable imaging assembly 436 and scale reticle 437. In some illustrative examples, imaging assembly 436 is configured to fit within an envelope having maximum dimensions of 4.6 inch by 2 inch by 2 inch. In one illustrative example, imaging assembly 436 is configured to fit within a confined space of less than 50 cubic inches. In some illustrative examples, imaging assembly 436 may be yet smaller. In one of these illustrative examples, imaging assembly 436 is configured to fit within a confined space of less than 20 cubic inches.

When imaging assembly 436 is used to inspect pin and bushing assembly 414, imaging assembly 436 is horizontal. Imaging assembly 436 is positioned such that the sight line of camera 438 is parallel to a floor of manufacturing environment 400.

Imaging assembly 436 includes camera 438 and lens system 440. Lens system 440 includes tunable-focus lens 442 and magnifying lens 444 between camera 438 and tunable-focus lens 442. Scale reticle 437 is positioned within a sight line of camera 438 of imaging assembly 436 such that scale reticle 437 is between imaging assembly 436 and target 446. As depicted, scale reticle 437 has distance marks 445.

In some illustrative examples, scale reticle 437 is up to an inch away from target 446. In these illustrative examples, imaging assembly 436 is configured to provide 1 inch of tunable-focus in front of target 446.

Magnifying lens 444 increases or decreases the effective size of an image captured by camera 438. In imaging assembly 436, magnifying lens 444 is between camera 438 and tunable-focus lens 442.

Tunable-focus lens 442 takes the form of any desirable lens having a focus that may be tuned. In some illustrative examples, tunable-focus lens 442 may be a liquid lens. In other illustrative examples, tunable-focus lens 442 is an electro-mechanical lens.

Imaging assembly 436 may be remotely controlled to inspect the alignment of pin and bushing assemblies 406. In some illustrative examples, each of camera 438, magnifying lens 444, and tunable-focus lens 442 is controllable remotely. By having imaging assembly 436 remotely controlled, operators may be a desirable distance from folding wingtip assembly 404 when folding wingtip assembly 404 is preloaded.

The alignment of pin and bushing assemblies 406 is determined based on the alignment of scale reticle 437 and target 446. Imaging assembly 436 is configured to take images of scale reticle 437 and target 446. In this illustrative example, target 446 is associated with pin 416 configured to move from bore 432 of clevis 422 through bore 428 of lug 420 and into bore 430 of clevis 422.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, target 446 may be associated with pin 416 by being painted onto, formed as a part of, or otherwise bonded to pin 416. For example, target 446 may be cut or formed into an end of pin 416. As another example, target 446 may be a sticker or other item adhered to pin 416. In yet another example, target 446 is painted or drawn onto an end of pin 416.

By determining the alignment of scale reticle 437 and target 446, the alignment of bore 428 and bore 432 is determined. By determining the alignment of scale reticle 437 and target 446, the alignment of clevis 422 and lug 420 is determined.

Measuring the alignment of scale reticle 437 and target 446 may also be referred to as measuring an axial offset of scale reticle 437 and target 446. An axial offset of scale reticle 437 and target 446 is a difference in locations of the central axis running through the center of scale reticle 437 and into imaging assembly 436 and the central axis running through target 446 and into imaging assembly 436. Some axial offset is considered within tolerance. An axial offset that is within tolerance does not cause undesirable interference between pin 416 and lug 420 or clevis 422. When the axial offset is found to be within tolerance, scale reticle 437 and target 446 are found to be desirably aligned.

Inspection system 434 further comprises mount 448. Mount 448 may also be referred to as a centering mount. Mount 448 supports camera 438 and lens system 440. Mount 448 is configured to attach imaging assembly 436 to first component 450 and center imaging assembly 436 relative to bore 430 of first component 450.

Mount 448 secures a position of camera 438 and lens system 440 relative to bore 432 of clevis 422. In this illustrative example, mount 448 includes shelf portion 451 and ring portion 452. Shelf portion 451 supports camera 438 and lens system 440. Ring portion 452 is secured to bore 432 of first component 450.

As depicted, inspection system 434 also includes reticle mount 454. Reticle mount 454 is configured to secure scale reticle 437 within bore 428 of second component 456. In some illustrative examples, reticle mount 454 includes two sides positioned on opposite sides of bore 428. The two sides of reticle mount 454 may be secured using any desirable means. In one illustrative example, reticle mount 454 is secured using bolt-type fasteners. In another illustrative example, reticle mount 454 is secured using spring loaded locks.

As depicted, imaging assembly 436 is connected to first component 450, and scale reticle 437 is connected to second component 456. In one illustrative example, first component 450 is a fixed component and second component 456 is a moveable component. Imaging assembly 436 is configured to take an image of scale reticle 437 within the moveable component and an image of target 446 for measurement of an alignment of target 446 relative to scale reticle 437. Imaging assembly 436 is configured such that an image of scale reticle 437 has a resolution of 0.001 inch. More specifically, in some illustrative examples, imaging assembly 436 is configured such that an image of scale reticle 437 has a resolution of 0.001 inch when scale reticle 437 is between approximately 0.5 inches and approximately 6 inches from imaging assembly 436.

Scale reticle 437 has distance marks 445 of 0.001 inch. When an image of scale reticle 437 has a resolution of 0.001 inch, distance marks 445 of 0.001 inch distance are clear in the image.

Imaging assembly 436 is connected to computer system 458 via cables 460. Computer system 458 is used to remotely control imaging assembly 436, including remote control of tuning of tunable-focus lens 442 and remotely controlling capture of images using image sensor 462 of camera 438. Computer system 458 may also be used to analysis of images captured using image sensor 462. For example, processor 464 may be used to analyze a first image and a second image by overlaying either the second image or data representative of the second image onto the first image.

The illustration of inspection system 434 and platform 401 in FIG. 4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, although the design and layout of inspection system 434 are described as configured to fit within a specified space of folding wingtip assembly 404 of aircraft 402, inspection system 434 may be used in any desirable type of platform 401.

As another example, lighting system 466 may be present and adhered to or connected to a portion of platform 401 to be inspected by inspection system 434. Lighting system 466 may provide sufficient light for taking images of at least one of scale reticle 437 or target 446 with inspection system 434. In one illustrative example, lighting system 466 is formed of LED's 468 removably connected to lug 420 of pin and bushing assembly 414.

As yet another example, although cables 460 are depicted as connecting computer system 458 and imaging assembly 436, in other illustrative examples, imaging assembly 436 may be connected to computer system 458 wirelessly. Wireless communications between computer system 458 and imaging assembly 436 may affect at least one of camera 438 or lens system 440.

As a further example, a number of additional components may connect camera 438 and lens system 440. In one illustrative example, a number of mirrors and a desirable housing connects camera 438 and lens system 440. This number of mirrors and desirable housing may function similarly to a periscope. By providing a number of mirrors and a housing, camera 438 need not be in-line with lens system 440. Although camera 438 may not be in-line with lens system 440, lens system 440 is still within the sight line of camera 438 due to the number of mirrors and housing. Likewise, if a number of mirrors and a housing are present, scale reticle 437 may still be present in the sight line of camera 438 even if scale reticle 437 is not in-line with camera 438.

Further, by providing a number of mirrors and a housing, camera 438 may be outside of a small or limited space. By providing a number of mirrors and a housing, camera 438 may have a larger volume or larger dimensions than allowed by a confined space for inspection.

In another illustrative example, a coherent fiber optic bundle may connect camera 438 and lens system 440. In this illustrative example, coherent fiber optic bundle may function similarly to a flexible periscope. Similar to using a number of mirrors and a housing, coherent fiber optic bundle may allow camera 438 to take images within a small or limited space without placing camera 438 within the small or limited space.

Figure 5:
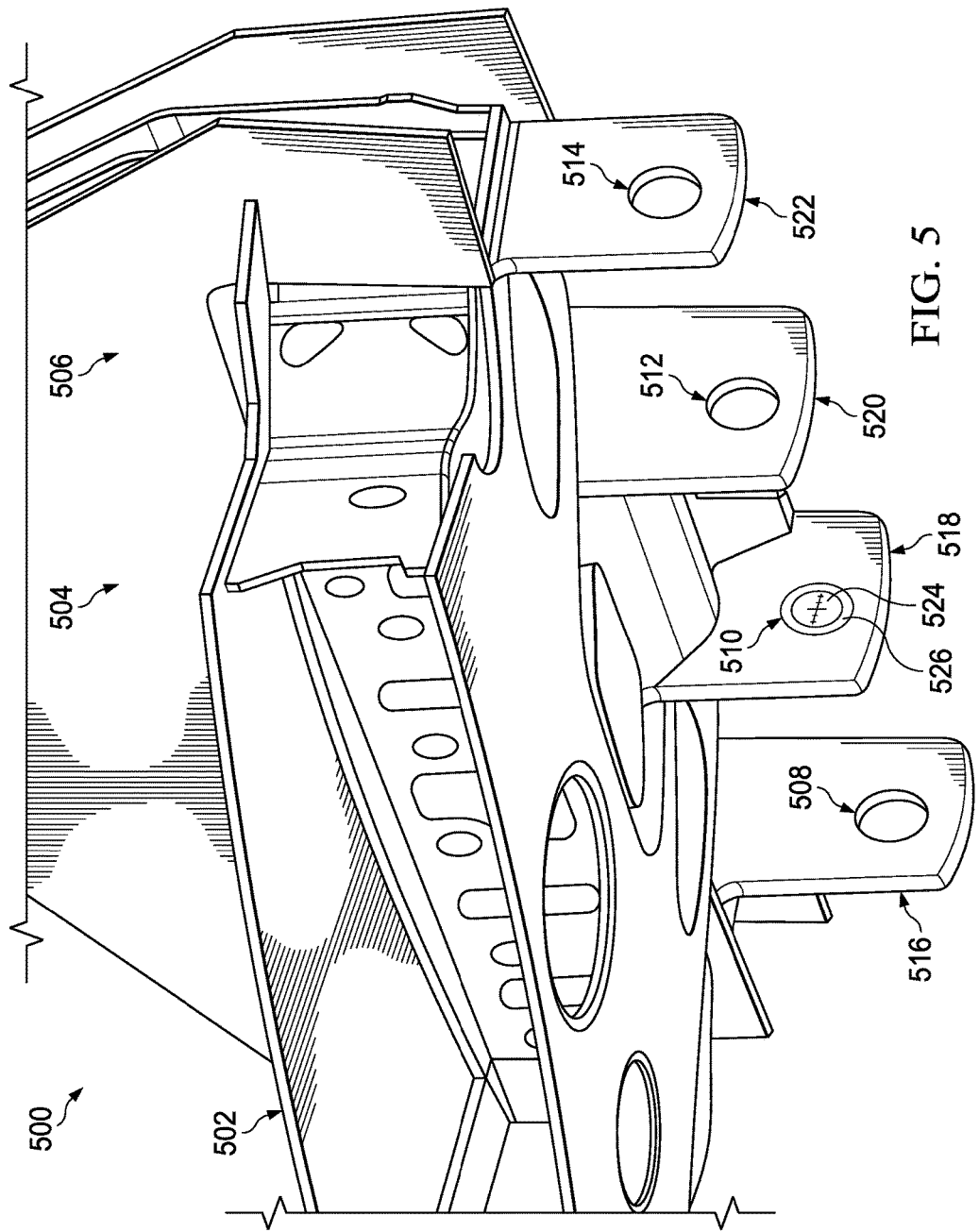
FIG. 5 is an illustration of an isometric view of a folding wingtip assembly which may be aligned using an inspection system in accordance with an illustrative embodiment.

Turning now to FIG. 5, an illustration of an isometric view of a folding wingtip assembly which may be aligned using an inspection system is depicted in accordance with an illustrative embodiment. Folding wingtip assembly 500 may be a physical implementation of folding wingtip assembly 404 of FIG. 4.

Folding wingtip assembly 500 includes fixed portion 502 and unfixed portion 504. As depicted, unfixed portion 504 is wing tip 506. Wing tip 506 is folded in order to facilitate the installation of a scale reticle, such as scale reticle 437 of FIG. 4, within a bore, such as bore 508, bore 510, bore 512, or bore 514 of unfixed portion 504. As depicted, bore 508 is within moving lug 516, bore 510 is within moving lug 518, bore 512 is within moving lug 520, and bore 514 is within moving lug 522.

As depicted, scale reticle 524 is installed within bore 510 of moving lug 518. During installation, reticle mount 526 may be aligned with an indicator. In one non-limiting example, reticle mount 526 is aligned during installation with cross hairs drawn on a moving lug surface. In this illustrative example, when wing tip 506 is folded, the line of scale reticle 524 will be horizontal. The line of scale reticle 524 will rotate 90 degrees when wing tip 506 is extended. When scale reticle 524 is installed horizontally, scale reticle 524 will be vertical when the tip is extended.

Each moving lug is paired with a clevis to form a respective bushing. To inspect a bushing and pin assembly for alignment, unfixed portion 504 will be rotated such that the scale reticle is in line of sight of a camera of an imaging assembly, such as camera 438 of imaging assembly 436 of FIG. 4.

One or more scale reticles may be installed in folding wingtip assembly 500 at one time. The greater number of scale reticles and imaging assemblies, the lower the inspection and alignment time. For example, when only one scale reticle and imaging assembly is utilized, the scale reticle will be used to align one of bore 508, bore 510, bore 512, or bore 514 and then folding wingtip assembly 500 will be powered down, and the scale reticle moved to another bore of bore 508, bore 510, bore 512, or bore 514. This scale reticle would be used in each of bore 508, bore 510, bore 512, and bore 514 to inspect each bore.

However, if four scale reticles and four imaging assemblies were provided, respective alignments for each of bore 508, bore 510, bore 512, or bore 514 could be performed substantially simultaneously. Substantially simultaneous alignment would result in at least one of reduced cycle time, reduced alignment time, or reduced cost.

The imaging assemblies can be installed either when wing tip 506 is folded, or may be extended through the maintenance access hatches on the underside of wing tip 506.

Imaging assemblies may be tested prior to extending wing tip 506. For example, to test an imaging assembly, a camera is turned on and the lens system is used to sight/focus a target under ambient (low) light. When performed, this check verifies that the cameras are operating prior to extending wing tip 506.

Figure 6:
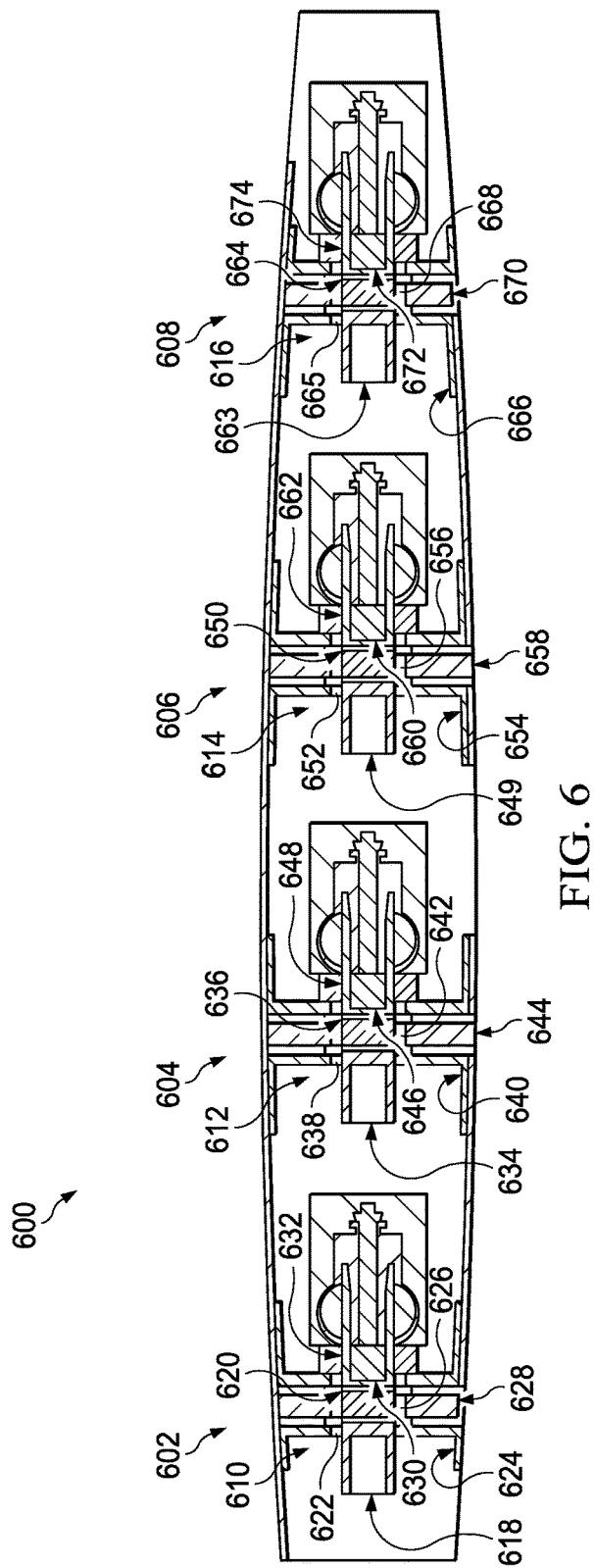
FIG. 6 is an illustration of a cross-sectional view of a folding wingtip assembly and inspection systems for aligning the folding wingtip assembly in accordance with an illustrative embodiment.

Turning now to FIG. 6, an illustration of a cross-sectional view of a folding wingtip assembly and inspection systems for aligning the folding wingtip assembly is depicted in accordance with an illustrative embodiment.

Folding wingtip assembly 600 is a physical implementation of folding wingtip assembly 404 of FIG. 4. Folding wingtip assembly 600 has pin and bushing assembly 602, pin and bushing assembly 604, pin and bushing assembly 606, and pin and bushing assembly 608.

As depicted, four inspection systems are installed relative to the four pin and bushing assemblies. By providing four inspection systems, the four pin and bushing assemblies may be aligned substantially simultaneously.

For example, inspection system 610 is connected to pin and bushing assembly 602. Inspection system 612 is connected to pin and bushing assembly 604. Inspection system 614 is connected to pin and bushing assembly 606. Inspection system 616 is connected to pin and bushing assembly 608.

Inspection system 610 includes imaging assembly 618 and scale reticle 620. Imaging assembly 618 is connected to bore 622 of clevis 624. Imaging assembly 618 includes a camera (not depicted) and a lens system (not depicted). The lens system includes a tunable-focus lens (not depicted) and a magnifying lens (not depicted) between the camera and the tunable-focus lens.

Each of inspection system 610, inspection system 612, inspection system 614, and inspection system 616 have a respective camera and lens system. In some illustrative examples, each of inspection system 610, inspection system 612, inspection system 614 and inspection system 616 have substantially the same camera and lens system. For example, the same type of camera and the same type of lenses may be present in inspection system 610, inspection system 612, inspection system 614 and inspection system 616.

Scale reticle 620 is connected to bore 626 of moving lug 628. Imaging assembly 618 takes a first image of target 630 on latch pin 632 at a first focal plane of a lens system of imaging assembly 618. In the first image, target 630 on latch pin 632 is within focus. Imaging assembly 618 takes a second image of scale reticle 620 at a second focal plane of a lens system of imaging assembly 618. In the first image, target 630 on latch pin 632 is within focus. In the second image, scale reticle 620 is in focus. An axial offset of a central axis of scale reticle 620 and a central axis of target 630 is determined. Alignment of clevis 624 and moving lug 628 is determined based on the axial offset.

Inspection system 612 includes imaging assembly 634 and scale reticle 636. Imaging assembly 634 is connected to bore 638 of clevis 640. Scale reticle 636 is connected to bore 642 of moving lug 644. Imaging assembly 634 takes a first image of target 646 on latch pin 648 at a first focal plane of a lens system of imaging assembly 634. Imaging assembly 634 takes a second image of scale reticle 636 at a second focal plane of a lens system of imaging assembly 634. In the first image, target 646 on latch pin 648 is within focus. In the second image, scale reticle 636 is in focus. An axial offset of a central axis of scale reticle 636 and a central axis of target 646 is determined. Alignment of clevis 640 and moving lug 644 is determined based on the axial offset.

Inspection system 614 includes imaging assembly 649 and scale reticle 650. Imaging assembly 649 is connected to bore 652 of clevis 654. Scale reticle 650 is connected to bore 656 of moving lug 658. Imaging assembly 649 takes a first image of target 660 on latch pin 662 at a first focal plane of a lens system of imaging assembly 649. Imaging assembly 649 takes a second image of scale reticle 650 at a second focal plane of a lens system of imaging assembly 649. In the first image, target 660 on latch pin 662 is within focus. In the second image, scale reticle 650 is in focus. An axial offset of a central axis of scale reticle 650 and a central axis of target 660 is determined. Alignment of clevis 654 and moving lug 658 is determined based on the axial offset.

Inspection system 616 includes imaging assembly 663 and scale reticle 664. Imaging assembly 663 is connected to bore 665 of clevis 666. Scale reticle 664 is connected to bore 668 of moving lug 670. Imaging assembly 663 takes a first image of target 672 on latch pin 674 at a first focal plane of a lens system of imaging assembly 663. Imaging assembly 663 takes a second image of scale reticle 664 at a second focal plane of a lens system of imaging assembly 663. In the first image, target 672 on latch pin 674 is within focus. In the second image, scale reticle 664 is in focus. An axial offset of a central axis of scale reticle 664 and a central axis of target 672 is determined. Alignment of clevis 666 and moving lug 670 is determined based on the axial offset.

Following installation of inspection system 610, inspection system 612, inspection system 614, and inspection system 616, the wing tip is lowered. Once the wing tip has been lowered, the wing tip is commanded to the preloaded position. The preloaded position may be many tens of thousands of pounds of force applied to the joint. Images of the respective scale reticles and targets are taken when the wing tip is in the preloaded position.

Although four inspection systems are depicted, any desirable number of inspection systems may be used. For example, only two inspection systems may be used, as opposed to four. When two inspection systems are used, the two inspection systems are initially used to determine an alignment of two of the pin and bushing assemblies. After aligning two of the pin and bushing assemblies, the two inspection systems would be removed and then relocated to the other two of the pin and bushing assemblies. Relocation of the inspection systems leads to an extra set of steps to repeat image capture after folding the wing tip and moving the setups to the remaining locations.

Each imaging assembly and scale reticle is removable. As can be seen in FIG. 6, the four inspection systems should be removed to allow the latch pins to extend through each of the four pin and bushing assemblies during normal operation of folding wingtip assembly 600. Thus, following inspection and alignment, the imaging assemblies and scale reticles are removed from the assembly.

Figure 7:
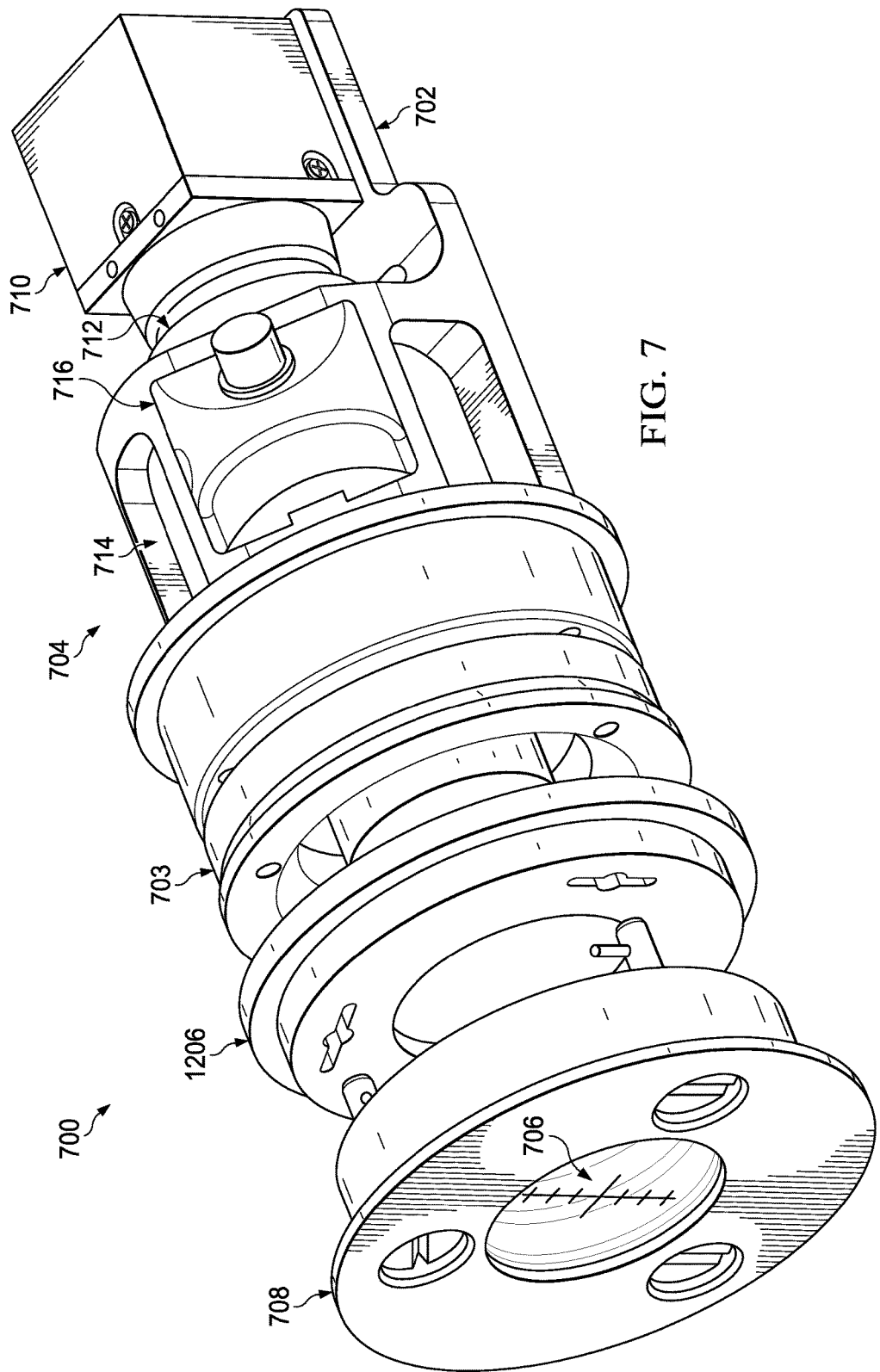
FIG. 7 is an illustration of an exploded view of an inspection system in accordance with an illustrative embodiment.

Turning now to FIG. 7, an illustration of an exploded view of an inspection system is depicted in accordance with an illustrative embodiment. Inspection system 700 is a physical implementation of inspection system 434 of FIG. 4.

Inspection system 700 comprises mount 702, ring 703, imaging assembly 704, scale reticle 706, and reticle mount 708. As can be seen, imaging assembly 704 includes camera 710, magnifying lens 712, and tunable-focus lens 714. Driver 716 for tunable-focus lens 714 is visible in FIG. 7.

Imaging assembly 704 may be remotely controlled to inspect alignment of components in a structure. Imaging assembly 704 may be referred to as a remotely controllable imaging assembly. In some illustrative examples, each of camera 710, magnifying lens 712, and tunable-focus lens 714 is controllable remotely. By having imaging assembly 704 remotely controlled, operators may be a desirable distance from a structure during inspection.

Mount 702 is a physical implementation of mount 448 of FIG. 4. Mount 702 holds camera 710 relative to a first component (not depicted). In some illustrative examples, mount 702 may also be referred to as a "camera mount." Imaging assembly 704 is a physical implementation of imaging assembly 436 of FIG. 4. Scale reticle 706 is a physical implementation of scale reticle 437 of FIG. 4. Reticle mount 708 is a physical implementation of reticle mount 454.

As can be seen in FIG. 7, scale reticle 706 is connected to reticle mount 708 to connect. Reticle mount 708 connects scale reticle 706 to a second component (not depicted). Imaging assembly 704 rests on mount 702 which is connected to ring 703 to connect imaging assembly 704 to a first component.

The first component and the second component may be any desirable components or structures. As can be seen from the description above, there are two sets of mounting hardware per location. In some illustrative examples, the first component and the second component are portions of a folding wingtip assembly. In these illustrative examples, scale reticle 706 is installed in the bore (not depicted) of the moving lug (not depicted). In these illustrative examples, mount 702 is installed on the forward fixed lug (not depicted), with camera 710 facing aft toward its locking pin actuator (LPA) (not depicted).

Figure 8:
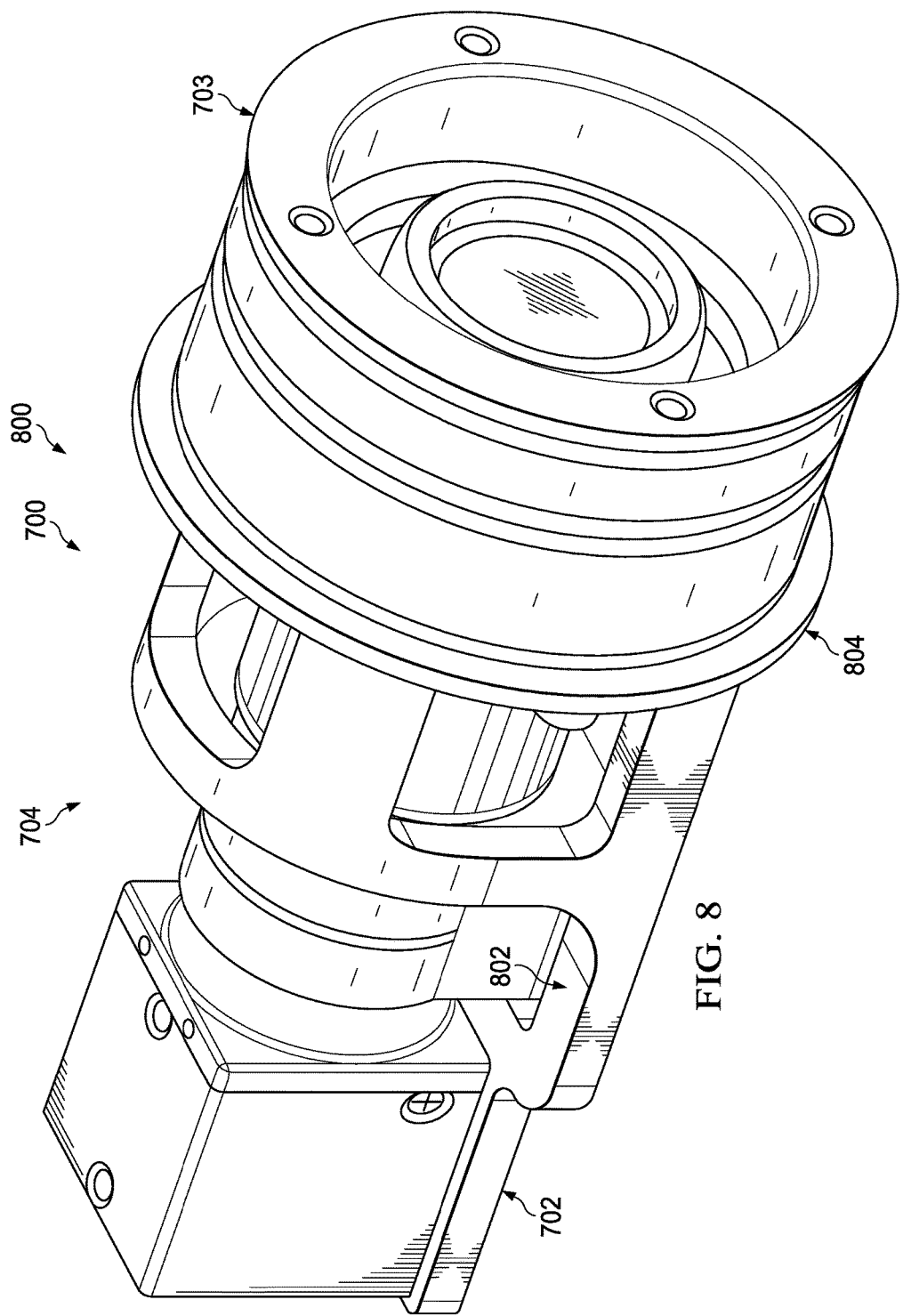
FIG. 8 is an illustration of an isometric view of an inspection system in accordance with an illustrative embodiment.

Turning now to FIG. 8, an illustration of an isometric view of portions of an inspection system is depicted in accordance with an illustrative embodiment. View 800 is a view of an assembled portion of inspection system 700 of FIG. 7. The assembled portion includes mount 702, ring 703, and imaging assembly 704 of FIG. 7. As depicted, imaging assembly 704 rests on shelf portion 802 of mount 702. Ring portion 804 of mount 702 is connected to ring 703. When inspection system 700 of FIG. 7 is installed, ring portion 804 is positioned on one side of a bore, while ring 703 is positioned on the opposite side of the bore.

FIG. 8 is not meant to imply physical or architectural limitations to the manner in which an illustrative embodiment may be implemented. Although camera 710 is depicted as directly connected to a lens system comprising magnifying lens 712 and tunable-focus lens 714, additional components may be present in other illustrative examples. In some non-depicted illustrated examples, a number of optic structures, such as mirrors, prisms, fiber optic materials, or other optic structures may be present between camera 710 and magnifying lens 712.

When additional components are present between camera 710 and magnifying lens 712, camera 710 may not rest on mount 702. In some illustrative examples when a number of optic structures are positioned between camera 710 and magnifying lens 712, camera 710 may extend past mount 702. When a number of optic structures are positioned between camera 710 and magnifying lens 712, camera 710 need not be positioned within an area to be inspected. For example, when a number of optic structures are positioned between camera 710 and magnifying lens 712, camera 710 need not be in-line with a joint, such as pin and bushing assembly 602, pin and bushing assembly 604, pin and bushing assembly 606, or pin and bushing assembly 608 of FIG. 6.

Figure 9:
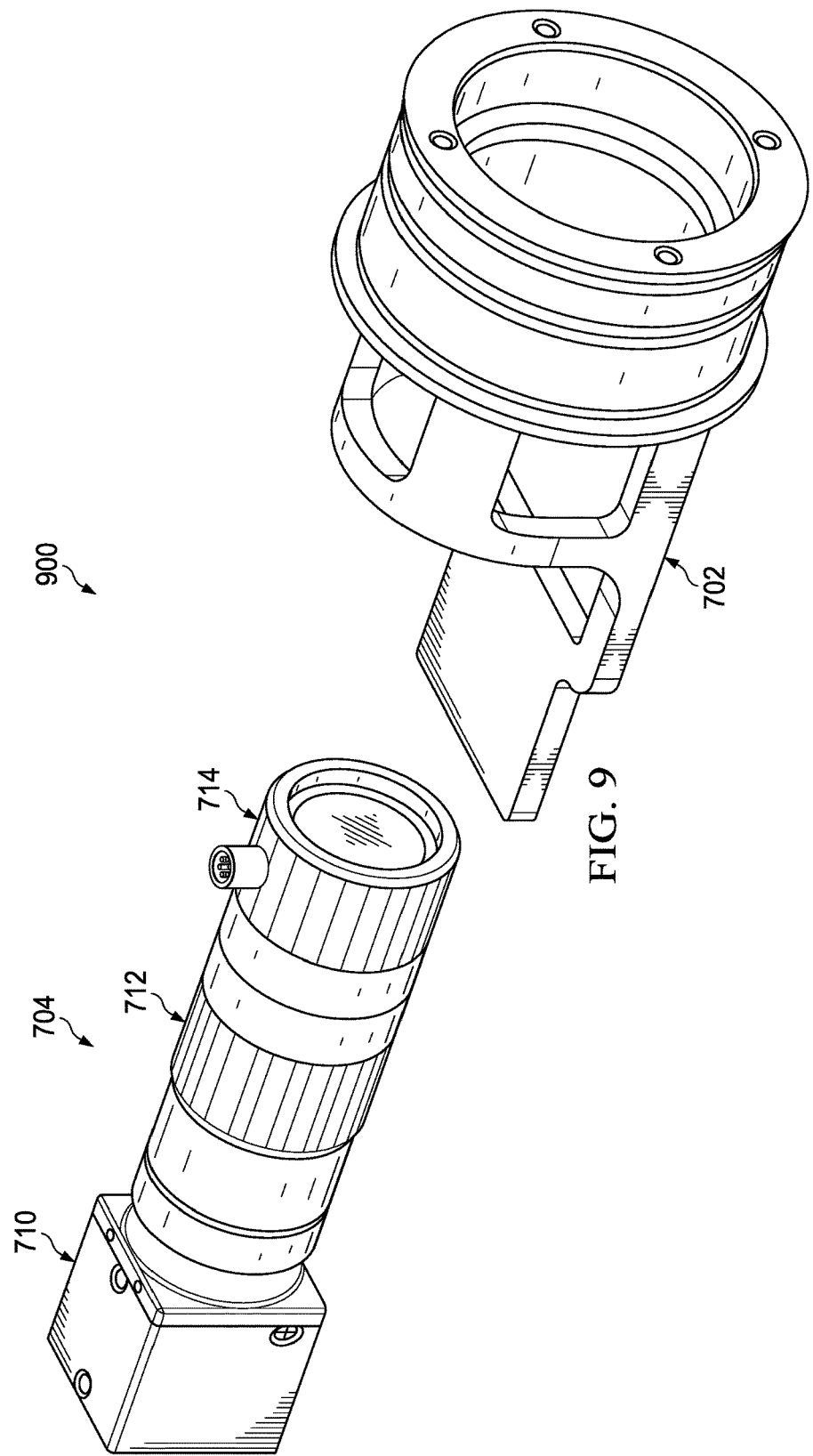
FIG. 9 is an illustration of an exploded view of a mount and imaging assembly in accordance with an illustrative embodiment.

Turning now to FIG. 9, an illustration of an exploded view of a mount and imaging assembly is depicted in accordance with an illustrative embodiment. View 900 is a view of imaging assembly 704 and mount 702. More specifically, view 900 is a view of imaging assembly 704 separated from mount 702. However, in view 900, imaging assembly 704 is assembled. As depicted, tunable-focus lens 714 is a liquid lens. However, tunable-focus lens 714 may take the form of any desirable type of tunable lens. For example, tunable-focus lens 714 may instead be an electro-mechanical lens.

Figure 10:
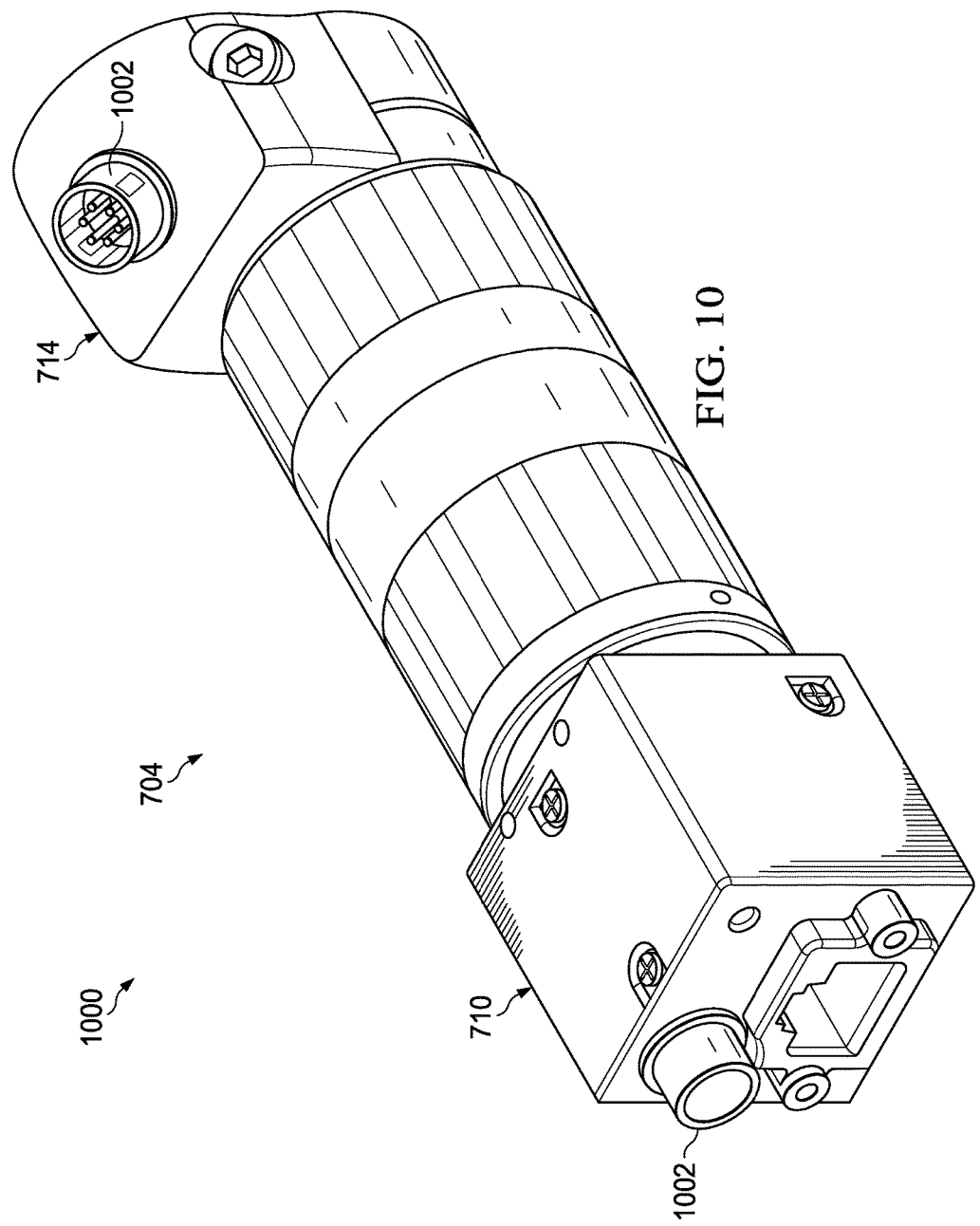
FIG. 10 is an illustration of an isometric view of an imaging assembly in accordance with an illustrative embodiment.

Turning now to FIG. 10, an illustration of an isometric view of an imaging assembly is depicted in accordance with an illustrative embodiment. View 1000 is an isometric view of imaging assembly 704 of FIGS. 7-9. In view 1000, ports 1002 for connecting camera 710 and tunable-focus lens 714 to a computer system are visible.

Figure 11:
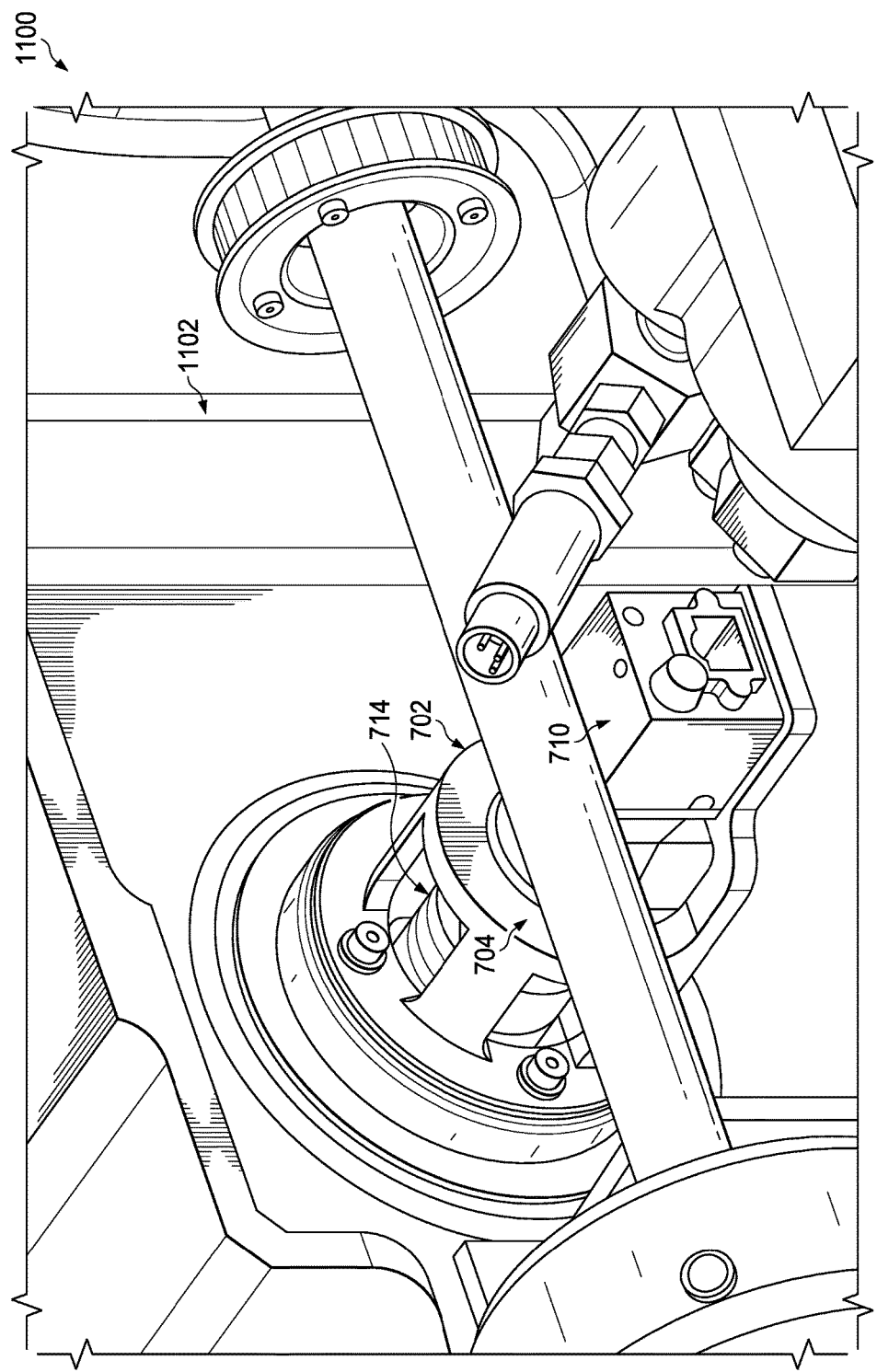
FIG. 11 is an illustration of an isometric side view of an imaging assembly connected to a folding wingtip assembly in accordance with an illustrative embodiment.

Turning now to FIG. 11, an illustration of an isometric side view of an imaging assembly connected to a folding wingtip assembly is depicted in accordance with an illustrative embodiment. As depicted in view 1100, imaging assembly 704 rests on mount 702 such that tunable-focus lens 714 is closest to items of folding wingtip assembly 1102 to be inspected, while camera 710 is the farthest from the items to be inspected.

Figure 12:
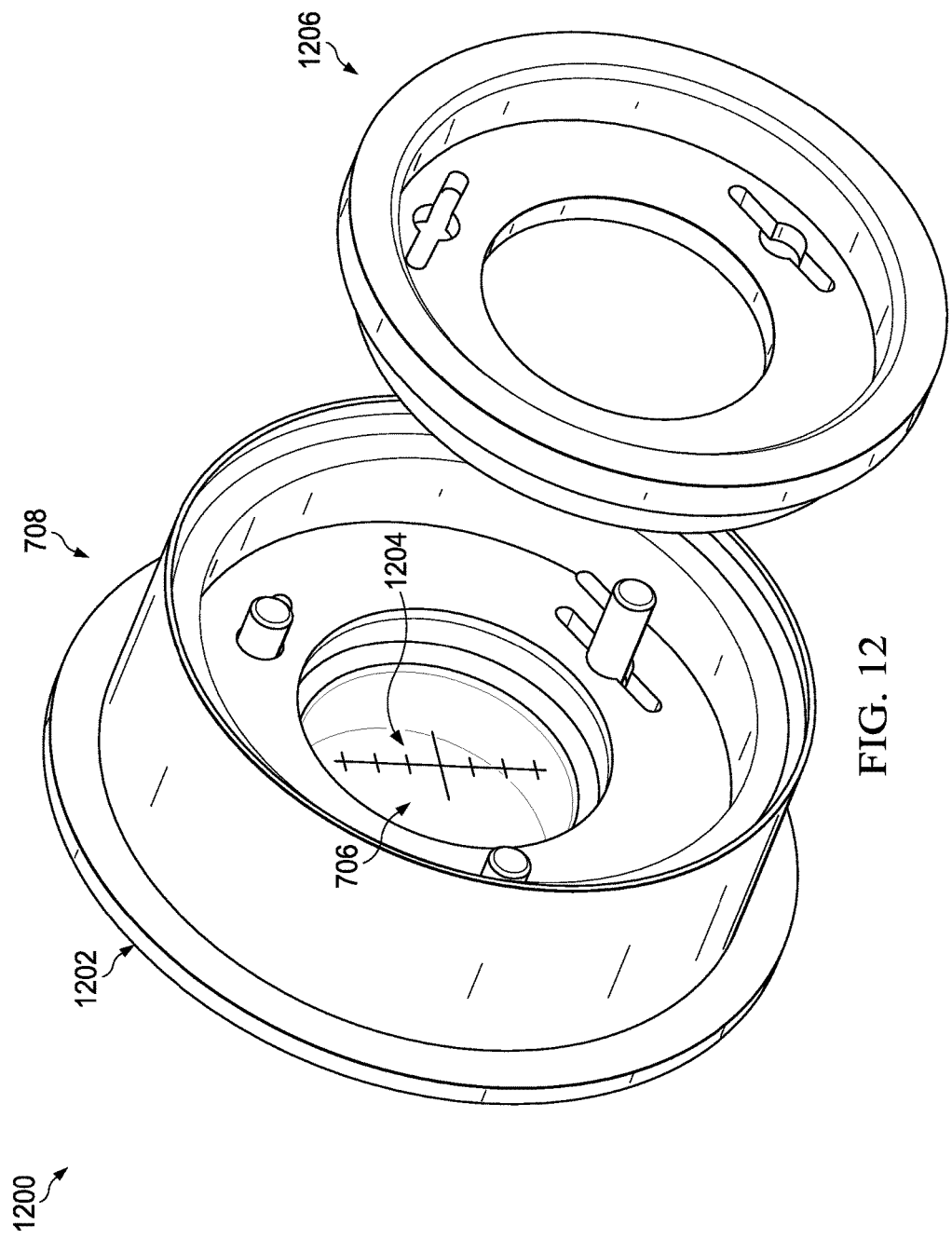
FIG. 12 is an illustration of an exploded view of a scale reticle and a reticle mount in accordance with an illustrative embodiment.

Turning now to FIG. 12, an illustration of an exploded view of a scale reticle and a reticle mount is depicted in accordance with an illustrative embodiment. As depicted in view 1200, scale reticle 706 is connected to first portion 1202 of reticle mount 708. Scale reticle 706 has distance marks 1204. To connect scale reticle 706 to a bore (not depicted) of a component (not depicted), first portion 1202 of reticle mount 708 and scale reticle 706 is placed on one side of a bore while securing portion 1206 of reticle mount 708 is placed on the opposite side (not depicted).

In other words, to install reticle mount 708, the two pieces, first portion 1202 of reticle mount 708 and securing portion 1206 of reticle mount 708, are secured on either side of the moving lug bore (not depicted). Fasteners extend through first portion 1202 attached to scale reticle 706 and connects reticle mount 708 on both sides of the component.

In this illustrative example, the side of first portion 1202 with the three screws faces out toward the latch pin actuator (LPA) (not depicted). Reticle mount 708 may be aligned with cross hairs drawn on a component's surface, such as a moving lug surface. When the wing tip is folded, the reference line of the scale reticle will be horizontal. It will rotate 90 degrees to be vertical when the wing tip is extended.

Figure 13:
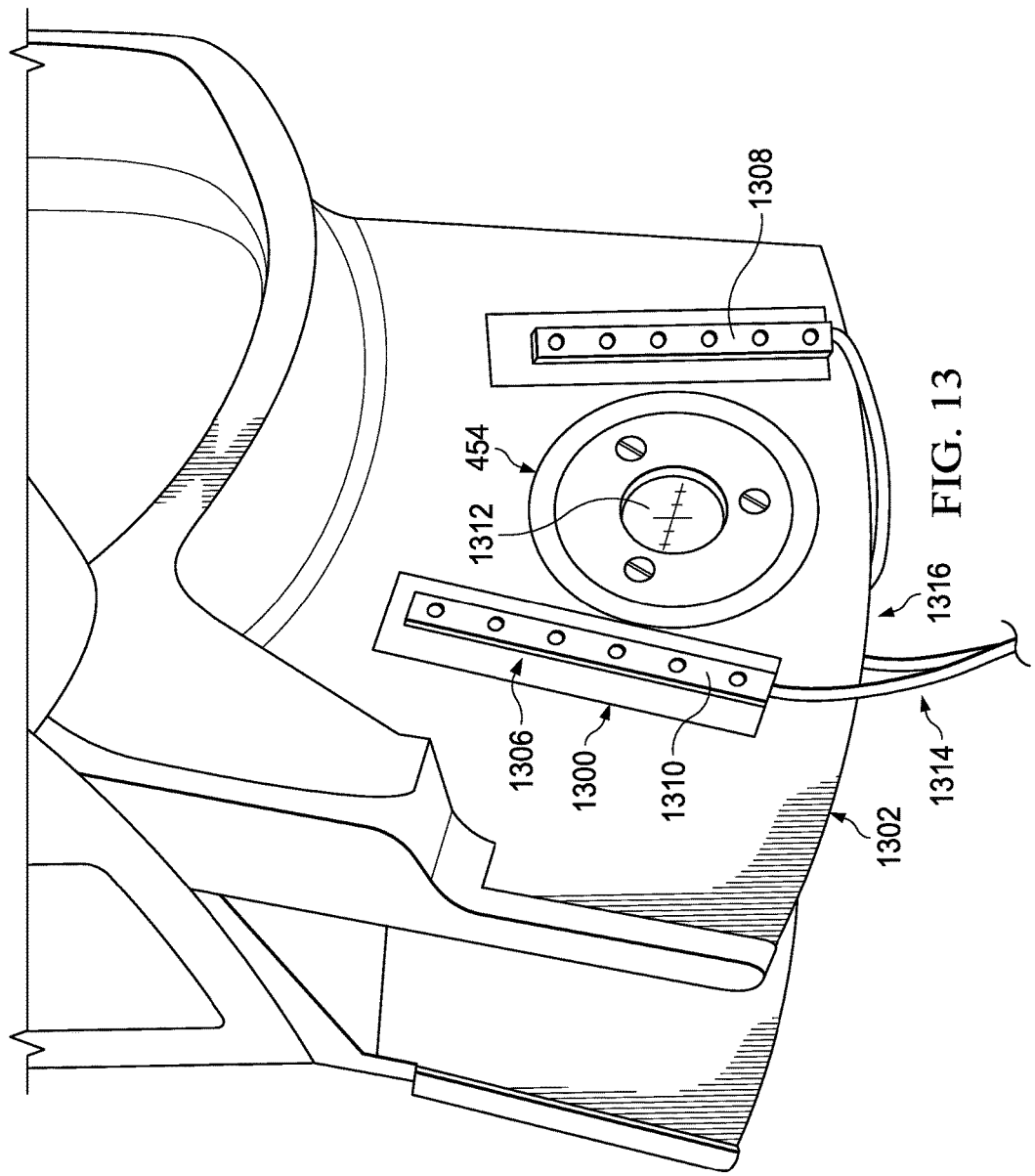
FIG. 13 is an illustration of an isometric view of a lighting system installed on a moving lug of a folding wingtip assembly in accordance with an illustrative embodiment.

Turning now to FIG. 13, an illustration of an isometric view of a lighting system installed on a moving lug of a folding wingtip assembly is depicted in accordance with an illustrative embodiment. Lighting system 1300 may be optionally included to enhance inspection system 700 of FIG. 7, or inspection system 434 of FIG. 4. As depicted, moving lug 1302 of folding wingtip assembly 1304 may be a physical implementation of lug 420 of folding wingtip assembly 404 in FIG. 4. Moving lug 1302 may be one of moving lug 516, moving lug 518, moving lug 520, or moving lug 522 of FIG. 5.

As depicted, lighting system 1300 includes light emitting diode (LED) strips 1306. Like components of inspection system 434, lighting system 1300 is desirably removable and reusable.

In some illustrative examples, to install lighting system 1300, two-sided tape is applied to each of LED strip 1308 and LED strip 1310. Two-sided tape provides a removable adhesive force. After applying two-sided tape to each of LED strip 1308 and LED strip 1310 of LED strips 1306, the LED strips are attached to a component.

In some illustrative examples, LED strips 1306 are attached to an aft side of moving lug 1302. As depicted, a portion of a reticle mount such as reticle mount 454 of FIG. 4 is also positioned within moving lug 1302. LED strips 1306 may be applied in any desirable pattern. LED strips 1306 desirably provide sufficient light to view the scale reticle (not depicted) and the target (not depicted). As depicted, LED strips 1306 are applied on opposite sides of bore 1312 with the reticle (not depicted) installed. In some other illustrative examples, LED strips 1306 may include an additional LED strip and may be applied in a triangle pattern around the bore.

LED strips 1306 are desirably installed to be as flush as possible. LED strip wires 1314 are routed desirably back along spine 1316 of moving lug 1302 and out of the wing tip (not depicted). In routing LED strip wires 1314, it is desirable to prevent or reduce rubbing or binding of LED strip wires 1314. In some illustrative examples, there is a sizable gap at the back when the wing tip is extended and LED strip wires 1314 will not rub or bind.

Figure 14:
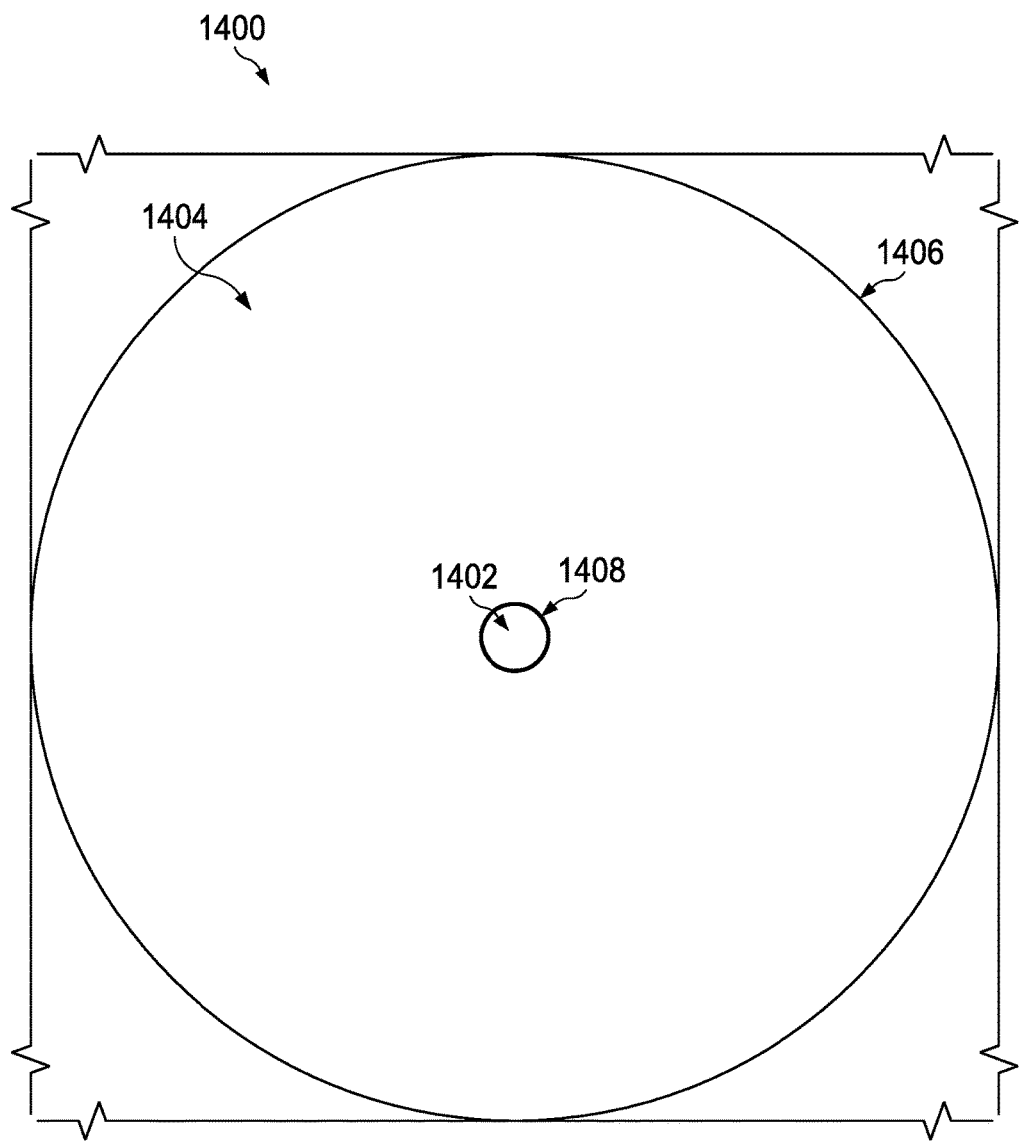
FIG. 14 is an illustration of a view of a target taken with an inspection system in accordance with an illustrative embodiment.

Turning now to FIG. 14, an illustration of a view of a target taken with an inspection system is depicted in accordance with an illustrative embodiment. View 1400 is a physical depiction of an image of target 446 of FIG. 4. View 1400 includes target 1402. As depicted, target 1402 is a dot substantially centered on an end of a latch pin. More specifically, target 1402 is a dot substantially centered on end 1404 of latch pin 1406, such as pin 416 shown in FIG. 4, closest to a scale reticle (not depicted).

In view 1400, representation 1408 is overlaid on target 1402. Representation 1408 is a circle having substantially the same diameter and center as target 1402. In some illustrative examples, representation 1408 is used to determine an axial offset between target 1402 and a scale reticle, such as scale reticle 437 of FIG. 4. In some illustrative examples, the image of target 1402 is used to determine an axial offset between target 1402 and a scale reticle (not depicted), such as scale reticle 437.

Representation 1408 may be set by an operator. In other illustrative examples, representation 1408 may be set by an automated program. Although representation 1408 is depicted as a circle, representation 1408 may take any desirable form. For example, representation 1408 may be a solid dot, a circle with a center point, a set of cross-hairs, or any desirable combination of shapes. Representation 1408 is created from an image taken by a camera, such as camera 710 of FIG. 7.

Figure 15:
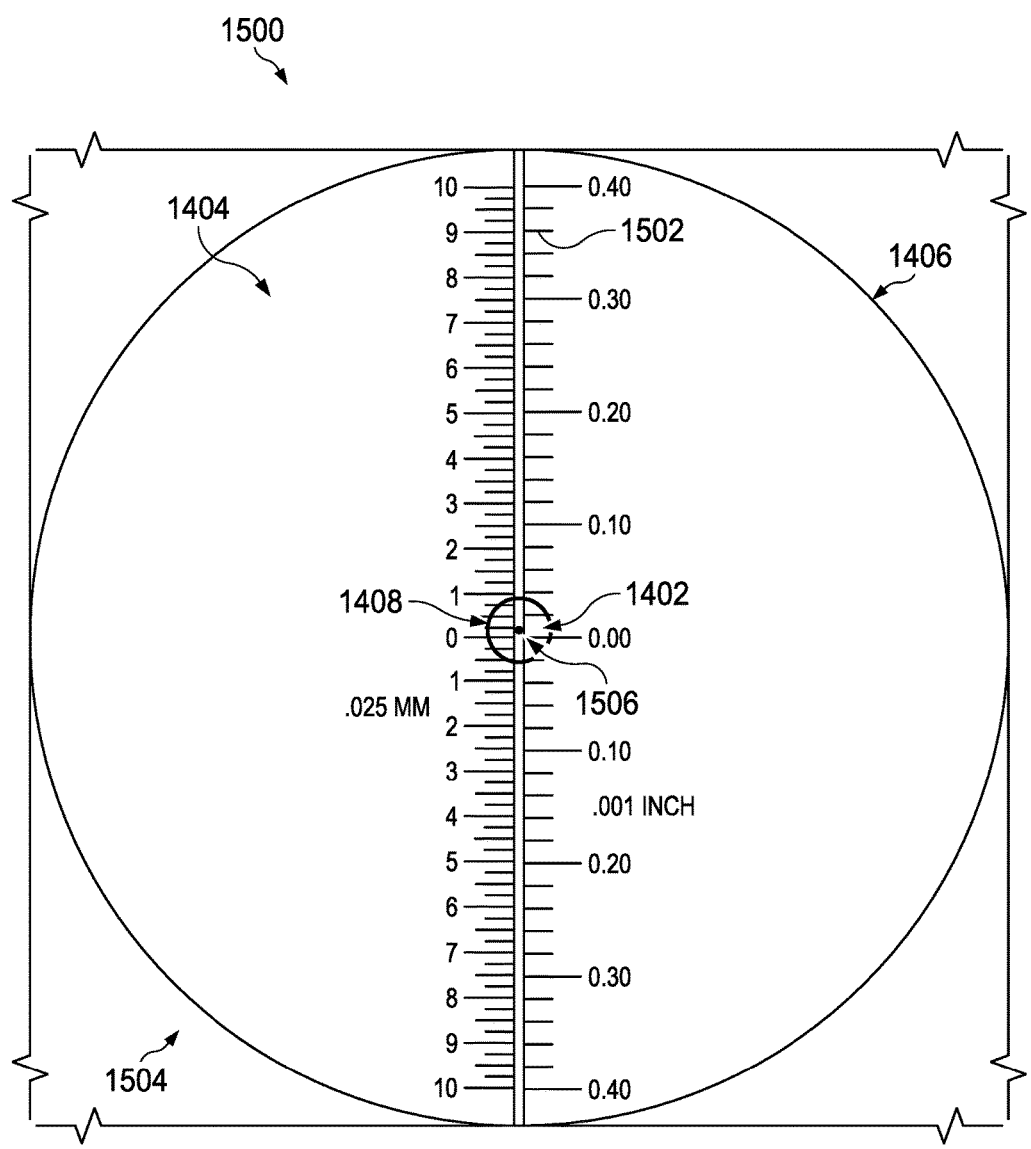
FIG. 15 is an illustration of a view of a representation of a target overlaid onto an image of a scale reticle and an out of focus target in accordance with an illustrative embodiment.

Turning now to FIG. 15, an illustration of a view of a representation of a target overlaid onto an image of a scale reticle and the out of focus target is depicted in accordance with an illustrative embodiment. View 1500 is a physical depiction of an image of scale reticle 437 and target 446 of FIG. 4.

View 1500 includes target 1402 and representation 1408 of FIG. 14. In view 1500, distance marks 1502 of scale reticle 1504 are also visible. In some illustrative examples, scale reticle 1504 may be the same as scale reticle 706. In other illustrative examples, scale reticle 1504 and scale reticle 706 are different. Distance marks 1502 are a physical implementation of distance marks 445 of FIG. 4. View 1500 may be referred to as an image of scale reticle 1504.

In view 1500, distance marks 445 of 0.001 inch spacing are visible and clear. Thus, view 1500 may be referred to as an image of scale reticle 1504 with a resolution of 0.001 inch. An unedited view of a scale reticle, such as scale reticle 1504, with a resolution of 0.001 inch would not have representation 1408 superimposed.

View 1500 is an image of scale reticle 1504 modified to overlay representation 1408. Once images of target 1402 and scale reticle 1504 are captured, an analyzer computer program is utilized to identify the axial offset (not depicted) of target 1402 from scale reticle 1504. This axial offset may also be referred to as the offset of latch pin 1406 associated with target 1402. As depicted, this offset may be an offset in the vertical direction.

Using the analyzer, paired pin and reticle image files (such as FIG. 14 and FIG. 15 without representation 1408) for a given location (1-4, such as pin and bushing assemblies 602, 604, 606, or 608) are analyzed. A representation, such as representation 1408 may be created by aligning a red circle with target 1402 on the pin image file. In some illustrative examples, target 1402 is a circular indentation machined into the center of the face of latch pin 1406. When viewing the pin image file, the center of the pin image may be identified by aligning representation 1408 with target 1402.

After creating representation 1408, a reticle image with the pin center digitally overlaid on the original image is displayed. FIG. 15 is an example of a reticle image with a pin center overlaid. The pin center digitally overlaid may either be target 1402 or representation 1408. In FIG. 15, representation 1408 is overlaid onto the reticle image.

The distance from the center of latch pin 1406 to the center of scale reticle 1504 is measured. The distance between the center of latch pin 1406 and the center of scale reticle 1504 is either manually or automatically measured.

In some illustrative examples, the center of latch pin 1406 to be measured is point 1506 within representation 1408. Note that the reticle is printed with 0.000 at its center. This serves as the center of the moving lug bore, when measured against either target 1402 or representation 1408 indicating the center of latch pin 1406. In these illustrative examples, measuring the difference includes measuring a distance between point 1506 and the 0.000 at the center of scale reticle 1504.

In other illustrative examples in which a point is not centered within either target 1402 or representation 1408, the pin center may be determined by the outer diameter of target 1402 or representation 1408. For example, when there is not a point centered within target 1402, an axial offset may be determined by determining the difference between the measurements of the intersections of the diameter of target 1402 with distance marks 1502.

After determining the offset for all four pin locations, such as those shown in FIG. 6, a shim thickness is determined. If all four pin locations are individually within the +/−0.015 inches of allowable range, no action is required. If not, the wing tip is folded to access the end stop plates and adjust the shim stack installed under the end stops.

Increasing the shim stack-up will lower the moving lug bore, such as bore 428 of FIG. 4, with respect to aligning with the latch pin, such as pin 416, (when viewed from the perspective of the pin itself). Decreasing the shim stack-up will raise the moving lug bore, such as bore 428 of FIG. 4, with respect to the pin surface.

After any adjustment, the area is cleared of personnel and the hydraulic system is pressurized. Extension of the wing tip and image capture/verification steps are repeated until the allowable clearance is achieved.

Figure 16:
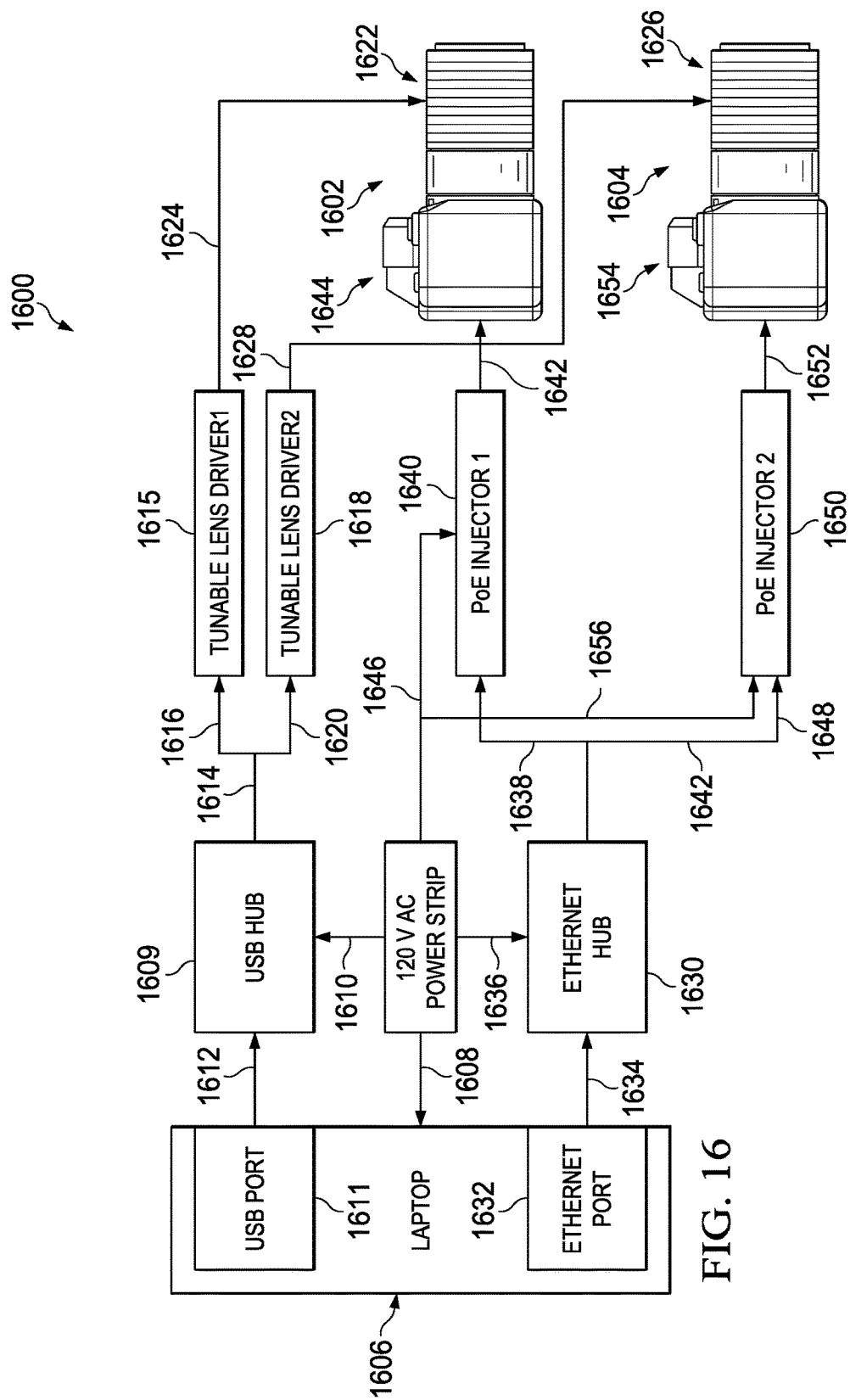
FIG. 16 is an illustration of a diagrammatic representation of imaging assemblies and connections to a computer system in accordance with an illustrative embodiment.

Turning now to FIG. 16, an illustration of a diagrammatic representation of imaging assemblies and connections to a computer system is depicted in accordance with an illustrative embodiment. FIG. 16 may be a diagrammatic representation of connections between computer system 458 and imaging assembly 436 of FIG. 4 with an additional imaging assembly. Assembly 1600 includes imaging assembly 1602, imaging assembly 1604, and computer system 1606. Imaging assembly 1602 and imaging assembly 1604 may take any desirable form. In some illustrative examples, imaging assembly 704 is a physical implementation of at least one of imaging assembly 1602 or imaging assembly 1604. Imaging assembly 1602 and imaging assembly 1604 may be remotely controlled using computer system 1606.

Connection 1608 connects computer system 1606 to a power source. After connecting computer system 1606 to the power source, the computer system may be turned on. After connecting computer system 1606 to the power source, USB hub 1609 is then connected to the power source as well using connection 1610.

USB hub 1609 is connected to one of the USB ports, USB port 1611 of computer system 1606, using connection 1612. Each tunable-focus lens driver is connected to a USB hub port of computer system 1606 using connections 1614. Connections 1614 may take the form of USB cables.

Tunable-focus lens driver 1615 is connected to computer system 1606 using connection 1616. Tunable-focus lens driver 1618 is connected to computer system 1606 using connection 1620. In some illustrative examples, connections 1614 is eliminated by connecting connection 1616 and connection 1620 direction to USB hub 1609.

Tunable-focus lens driver 1615 is connected to tunable-focus lens 1622 using connection 1624. In some illustrative examples, connection 1624 is a Hirose cable. Connection 1624 connects tunable-focus lens 1622 to computer system 1606.

Tunable-focus lens driver 1618 is connected to tunable-focus lens 1626 using connection 1628. In some illustrative examples, connection 1628 is a Hirose cable. Connection 1628 connects tunable-focus lens 1626 to computer system 1606.

Ethernet hub 1630 is connected to the Ethernet port 1632 of computer system 1606 using connection 1634. In some illustrative examples, connection 1634 is Cat5 cable.

Ethernet hub 1630 is connected to the power source using power cable 1636. Connection 1638 connects the "In" port of first Power over Ethernet (PoE) Injector 1640 to Ethernet hub 1630. In some illustrative examples, connection 1638 takes the form of Cat 5 cable. Connection 1642 connects the "out" port of first PoE Injector 1640 to camera 1644. Connection 1642 provides power over Ethernet to camera 1644.

First PoE Injector 1640 is connected to the power source using connection 1646. In some illustrative examples, connection 1646 is a power cord.

Connection 1648 connects the "In" port of second PoE Injector 1650 to Ethernet hub 1630. In some illustrative examples, connection 1648 takes the form of Cat 5 cable. Connection 1652 connects the "out" port of second PoE Injector 1650 to camera 1654. Connection 1652 provides power over Ethernet to camera 1654.

Second PoE Injector 1650 is connected to the power source using connection 1656. In some illustrative examples, connection 1656 is a power cord.

The illustrations of aircraft 100 in FIGS. 1-3, manufacturing environment 400 in FIG. 4, and inspection system 700 or portions of inspection system 700 in FIGS. 7-16 are not meant to imply physical or architectural limitations to the manner in which an illustrative embodiment may be implemented. Other components, in addition to or in place of the ones illustrated, may be used. Some components may be unnecessary.

The different components shown in FIGS. 1-3 and 5-16 may be combined with components in FIG. 4, used with components in FIG. 4, or a combination of the two. Additionally, some of the components in FIGS. 1-3 and 5-16 may be illustrative examples of how components shown in block form in FIG. 4 may be implemented as physical structures.

Figure 17:
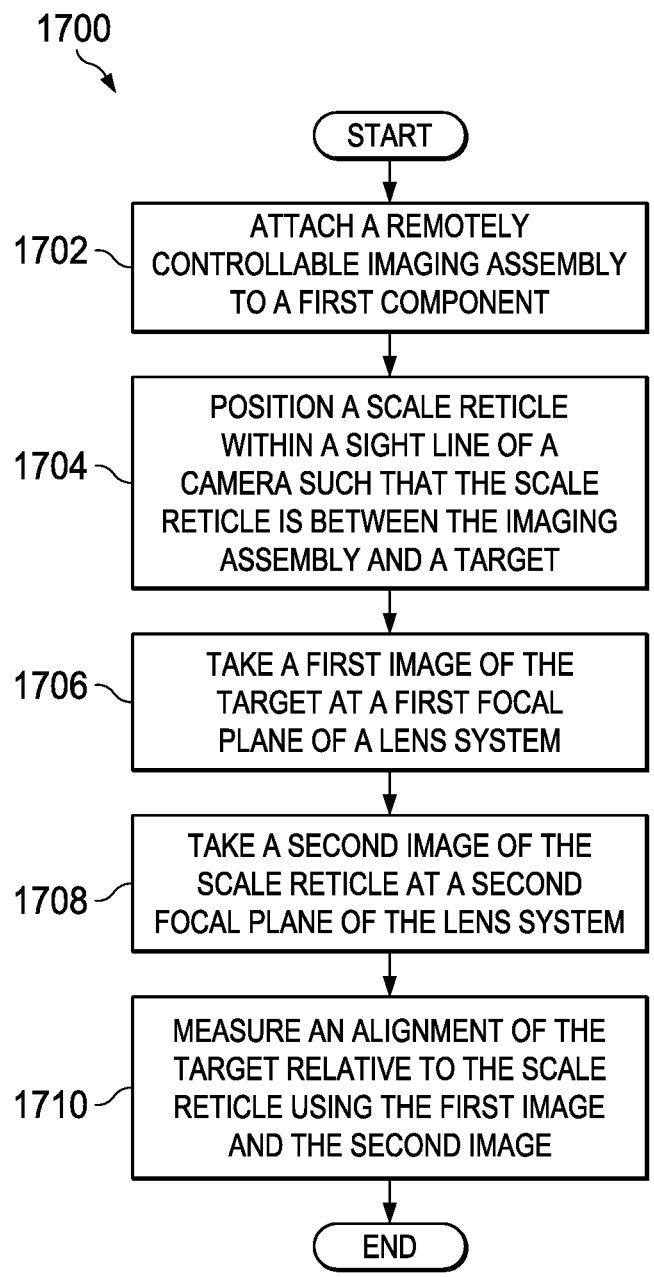
FIG. 17 is an illustration of a flowchart of a method for aligning a component and a target in accordance with an illustrative embodiment.

Turning now to FIG. 17, an illustration of a flowchart of a method for aligning a component and a target is depicted in accordance with an illustrative embodiment. Method 1700 may use inspection system 434 of FIG. 4. Method 1700 may be used to align folding wingtip assembly 500 of FIG. 5. Method 1700 may be used to align folding wingtip assembly 600 of FIG. 6. Method 1700 attaches a remotely controllable imaging assembly to a component (operation 1702).

Method 1700 positions a scale reticle of the inspection system within a sight line of the camera such that the reticle is between the imaging assembly and a target (operation 1704). In some illustrative examples, positioning the scale reticle of the inspection system within the sight line of the camera of the imaging assembly is positioning the scale reticle between 0.5 inches and 6 inches from the imaging assembly.

Method 1700 takes a first image of the target at a first focal plane of the lens system (operation 1706). Method 1700 takes a second image of the reticle at a second focal plane of the lens system (operation 1708). Method 1700 measures an alignment of the target relative to the reticle using the first image and the second image (operation 1710). Afterwards the method terminates.

In some illustrative examples, measuring the alignment of the target relative to the scale reticle comprises at least one of overlaying a portion of the second image onto the first image or overlaying data representative of the target within second image onto the first image. In some illustrative examples, the scale reticle is up to an inch away from the target.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 1700 also remotely focuses the tunable lens onto the scale reticle to change from the first focal plane of the lens system to the second focal plane of the lens system. As another illustrative example, method 1700 also focuses the magnifying lens on the target to set the first focal plane.

In some illustrative examples, method 1700 further comprises attaching the scale reticle to a bore of a movable lug, and attaching the imaging assembly of the inspection system to the component comprises attaching the imaging assembly to a bore of a clevis.

In these illustrative examples, positioning the scale reticle of the inspection system within the sight line of the camera of the imaging assembly comprises positioning the movable lug such that a bore of the movable lug is substantially concentric with the bore of the clevis. In some illustrative examples, the target is associated with a pin configured to move through the bore of the movable lug and into the bore of the clevis.

Figure 18:
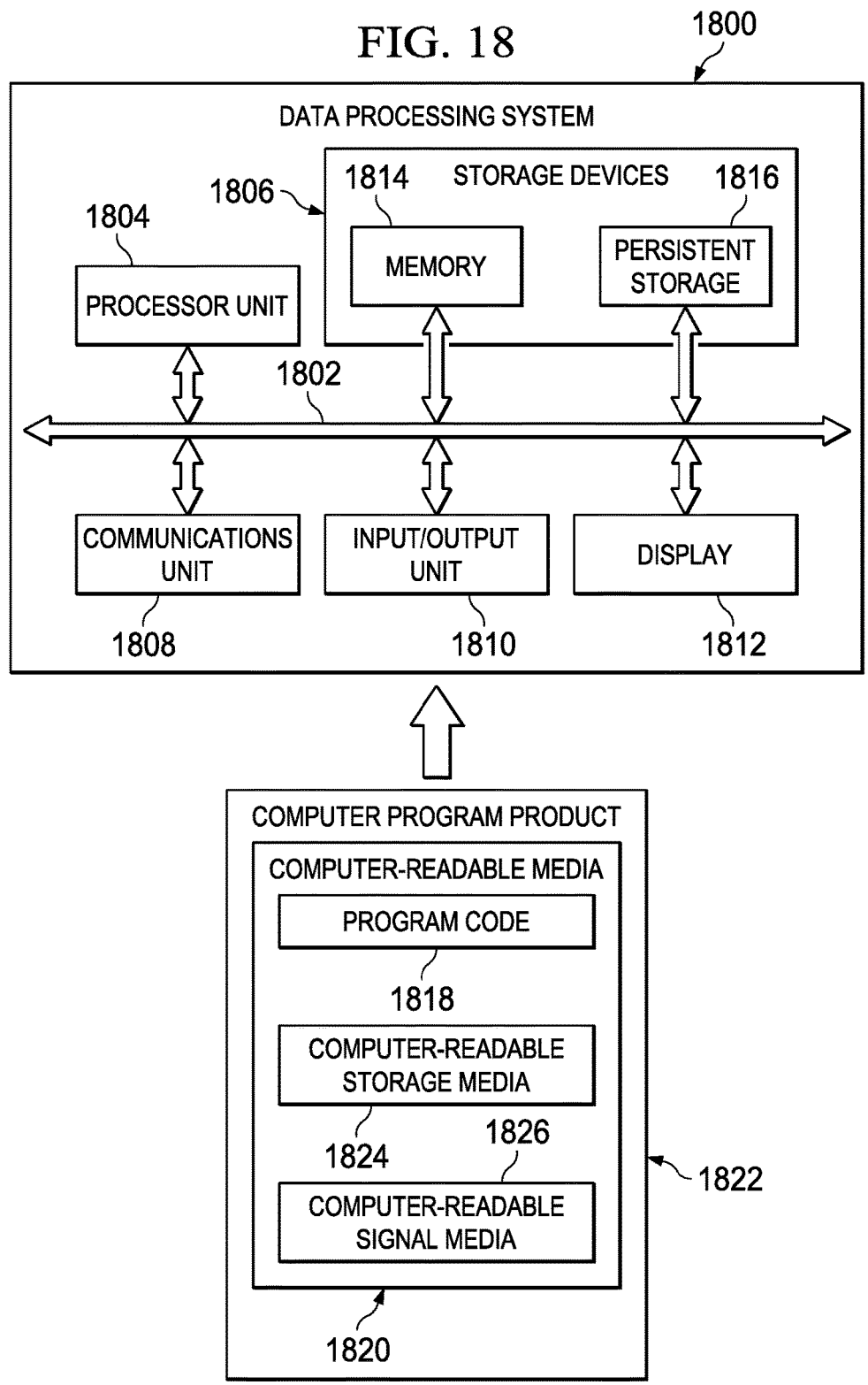
FIG. 18 is an illustration of a data processing system in the form of a block diagram in accordance with an illustrative embodiment.

Turning now to FIG. 18, an illustration of a data processing system in the form of a block diagram is depicted in accordance with an illustrative embodiment. Data processing system 1800 may be used to implement processor 464 of FIG. 4. Data processing system 1800 may be used to process data, such as images, from image sensor 462 of FIG. 4. Data processing system 1800 may be used to send commands to equipment, such as camera 438 or tunable-focus lens 442 of FIG. 4. As depicted, data processing system 1800 includes communications framework 1802, which provides communications between processor unit 1804, storage devices 1806, communications unit 1808, input/output unit 1810, and display 1812. In some cases, communications framework 1802 may be implemented as a bus system.

Processor unit 1804 is configured to execute instructions for software to perform a number of operations. Processor unit 1804 may comprise a number of processors, a multi-processor core, and/or some other type of processor, depending on the implementation. In some cases, processor unit 1804 may take the form of a hardware unit, such as a circuit system, an application specific integrated circuit (ASIC), a programmable logic device, or some other suitable type of hardware unit.

Instructions for the operating system, applications, and/or programs run by processor unit 1804 may be located in storage devices 1806. Storage devices 1806 may be in communication with processor unit 1804 through communications framework 1802. As used herein, a storage device, also referred to as a computer-readable storage device, is any piece of hardware capable of storing information on a temporary and/or permanent basis. This information may include, but is not limited to, data, program code, and/or other information.

Memory 1814 and persistent storage 1816 are examples of storage devices 1806. Memory 1814 may take the form of, for example, a random-access memory or some type of volatile or non-volatile storage device. Persistent storage 1816 may comprise any number of components or devices. For example, persistent storage 1816 may comprise a hard drive, a flash memory, a rewritable optical disk, a rewritable magnetic tape, or some combination of the above. The media used by persistent storage 1816 may or may not be removable.

Communications unit 1808 allows data processing system 1800 to communicate with other data processing systems and/or devices. Communications unit 1808 may provide communications using physical and/or wireless communications links.

Input/output unit 1810 allows input to be received from and output to be sent to other devices connected to data processing system 1800. For example, input/output unit 1810 may allow user input to be received through a keyboard, a mouse, and/or some other type of input device. As another example, input/output unit 1810 may allow output to be sent to a printer connected to data processing system 1800.

Display 1812 is configured to display information to a user. Display 1812 may comprise, for example, without limitation, a monitor, a touch screen, a laser display, a holographic display, a virtual display device, and/or some other type of display device.

In this illustrative example, the processes of the different illustrative embodiments may be performed by processor unit 1804 using computer-implemented instructions. These instructions may be referred to as program code, computer-usable program code, or computer-readable program code, and may be read and executed by one or more processors in processor unit 1804.

In these examples, program code 1818 is located in a functional form on computer-readable media 1820, which is selectively removable, and may be loaded onto or transferred to data processing system 1800 for execution by processor unit 1804. Program code 1818 and computer-readable media 1820 together form computer program product 1822. In this illustrative example, computer-readable media 1820 may be computer-readable storage media 1824 or computer-readable signal media 1826.

Computer-readable storage media 1824 is a physical or tangible storage device used to store program code 1818 rather than a medium that propagates or transmits program code 1818. Computer-readable storage media 1824 may be, for example, without limitation, an optical or magnetic disk or a persistent storage device that is connected to data processing system 1800.

Alternatively, program code 1818 may be transferred to data processing system 1800 using computer-readable signal media 1826. Computer-readable signal media 1826 may be, for example, a propagated data signal containing program code 1818. This data signal may be an electromagnetic signal, an optical signal, and/or some other type of signal that can be transmitted over physical and/or wireless communications links.

The illustration of data processing system 1800 in FIG. 18 is not meant to provide architectural limitations to the manner in which the illustrative embodiments may be implemented. The different illustrative embodiments may be implemented in a data processing system that includes components, in addition to or in place of those illustrated, for data processing system 1800. Further, components shown in FIG. 18 may be varied from the illustrative examples shown.

The illustrative embodiments of the disclosure may be described in the context of aircraft manufacturing and service method 1900 as shown in FIG. 19 and aircraft 2000 as shown in FIG. 20. Turning first to FIG. 19, an illustration of a block diagram of an aircraft manufacturing and service method is depicted in accordance with an illustrative embodiment. During pre-production, aircraft manufacturing and service method 1900 may include specification and design 1902 of aircraft 2000 of FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of a block diagram of an aircraft is depicted in which an illustrative embodiment may be implemented. In this example, aircraft 2000 is produced by aircraft manufacturing and service method 1900 of FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1900 of FIG. 19.

One or more illustrative embodiments may be used during component and subassembly manufacturing 1906 and system integration 1908 to inspect alignment of components of airframe 2002. For example, folding wingtip assembly 404 of FIG. 4 is installed during component and subassembly manufacturing 1906 and system integration 1908 of FIG. 19. Further, inspection system 434 of FIG. 4 is attached, utilized, and removed during component and subassembly manufacturing 1906 and system integration 1908 of FIG. 19. Inspection system 434 is used to align components of folding wingtip assembly 404 of FIG. 4 during component and subassembly manufacturing 1906 and system integration 1908. Folding wingtip assembly 404 of FIG. 4 may be a component of airframe 2002. If for any reason, a hinged joint is created or aligned during routine maintenance and service 1914, inspection system 434 may be used to align the hinged joint.

The illustrative embodiments provide an apparatus and method for aligning multiple joints at installation, substantially simultaneously, using software camera controlled hardware instead of manual labor. In some illustrative examples, the multiple joints are joints of winglets.

The system uses anywhere from one to a plurality of electronically focused cameras and target (reticle) systems, mounting accessories intended to properly center said cameras in their respective bushing-and-pin arrangements to determine alignment, a machine vision computing device (for example, laptop computer or similar), and computer to camera cabling or wireless connection device (for example, Bluetooth). For alignment projects where multiple bushing-and-pin arrangements must be aligned, this inspection system permits all said arrangements to be analyzed and aligned substantially simultaneously, or in sequence at the operator's discretion.

The illustrative examples of inspection systems save production costs by alignment cycle time reduction. The illustrative examples of inspection systems also present an improvement in ergonomics and personnel safety.

The illustrative examples present a system comprising multiple camera systems remotely controlled by a software, each of the camera systems is paired to a joint, wherein the remote controlling software determines a joint alignment data for the multiple joints using data collected through their respective cameras and issues and command to enable alignment of all the joints at once, wherein the alignment data is determined while taking into account the different weight deflection, and wherein the different camera systems are focused automatically, and send their focus data to the controlling software to use to determine the joint alignment data.

Aligning folding wings can be time consuming and inefficient due to the multiple labor intensive rounds of adjusting the joints. The illustrative examples present hardware that comprises a camera with extreme depth of focus at each of the joints, a software that controls the focus at each of the cameras, and another software that jointly optimizes the alignment data for all the cameras at once, while balancing non-uniform and unsymmetrical weight deflection throughout the wing.

A two-camera system may be used twice to adjust and verify the proper alignment of the four hinge latch pins, relative to their corresponding clevis bushings, on a folding wingtip assembly test article. A compact mounting and lighting configuration may be used for the cameras and target reticles. The system was operated from a laptop computer, such as computer system 458 of FIG. 4, with Ethernet connections to the cameras. State-of-the-art liquid lenses are one example of tunable-focus lenses, such as tunable-focus lens 442 of FIG. 4, to control the camera focus. An interactive software program numerically measures the alignment offset. The measurements for a folding wingtip assembly, such as folding wingtip assembly 404, are made with the hinge line preloaded to 73,000 pounds. The entire inspection system was designed to operate remotely, from up to 25 feet away from the test article. This distance keeps the operator at a safe distance from the energized structure. A four-camera version of the system may be used in production.

The Folding Wing Tip (FWT) Vision System, such as inspection system 434, was developed for the purpose of sighting the alignment of the latch pin actuator (LPA) pins, such as pin 416, and the moving lug bushings, such as bushing 418, when under preload. It is an external set of cameras and imaging software that connects to a portable laptop. The Folding Wing Tip (FWT) Vision System was developed taking into account depth of field constraints that are part of the folding wing tip (FWT) physical build.

Preload is used during normal system operation to prevent adverse conditions including, but not limited to, side loading of the latch pin actuators (LPAs) and decreased service life. Rigging under preload and live hydraulics presents other potential safety hazards which prevent shop personnel from gaining close proximity to the wing tip. The remote vision system alleviates this issue by placing cameras in the far fixed lugs facing each latch pin actuator (LPA) pin, centered in the respective near fixed lug. For example, camera 438 is placed to view through bore 432 of clevis 422 and target 446 of pin 416 is centered in bore 430 of clevis 422. A scale reticle is centered within the moving lug bushing. For example, scale reticle 437 is centered within bore 428 of FIG. 4.

In some illustrative examples, the scale reticle may instead be referred to as a "bomber sight" reticle. When the wing tip is extended and preloaded, the reticle provides a measure of how well the pins will align with the moving lug bores when pin extension is commanded. Across each of the four latch pin actuator (LPA) locations, there is a diametrical clearance of +/−0.015". Due to the unique loading characteristics of the folding wing tip, the forward and aft most latch pin actuator (LPA) locations (1 and 4) deflect considerably more than the interior latch pin actuator (LPA) locations (2 and 3), installed directly next to the two structural end stop fittings, when subjected to a given preload. Latch pin actuator (LPA) locations (1 and 4) may be seen at latch pin 632 and latch pin 674 of FIG. 6.

Latch pin actuator (LPA) locations (2 and 3) may be seen at latch pin 648 and latch pin 662 of FIG. 6. This bending deflection pattern is generally referred to as the "banana" effect, given the shape when all points are plotted together.

The rigging process utilizes the adjustment of shim stacks installed underneath the two end stop plates, so that "banana" pattern shifts up and down together, with more or less shim thickness installed. The moving lugs at locations 1 and 4 (the end points of the "banana") deflect within 0.015 inch of the latch pin actuator (LPA) pin center toward the six o'clock position, within the moving lug bore, and the inner locations 2 and 3 deflect toward the 12 o'clock position within the same 0.015 inch allowable.

The Folding Wing Tip (FWT) Vision System was initially used to sight the latch pin actuator (LPA) pins under preload, with the end stop fittings purposely under-shimmed in order to avoid potential overloading to the end stops and surrounding structure. Images are processed in real time to diagnose the appropriate additional shim thickness to install in order to align the latch pin actuator (LPA) pins with the moving lug bores, when under preload. Additional shim thickness was installed and all four locations were sighted with the cameras a second time, after adjustment. After adjustment for reticle error, all locations were found to be within the +/−0.015 inch diametrical tolerance allowable. Cameras are then removed and latch pin actuator (LPA) hydraulic lines reinstalled.

The Folding Wing Tip (FWT) Vision System allows for diagnosable shimming to structurally align the wing tip. If desired, the Folding Wing Tip (FWT) Vision System may be validated using the bluing technique. Findings are in line with the structural deflection model.

The vision system is used to sight and measure the alignment between the latch pin assembly (LPA) pin installed in the aft fixed clevis and the moving lug bore as the system is held under preload (many tens of thousands in-lbs torque, such as 70,000 in-lbs torque). The preload is applied via the Folding Wing Tip (FWT) power drive and stiffens the wing tip hinge to where the target bores will not "bounce" while inserting the latch pins. In service, this preload may be used during taxiing. This large preload and live hydraulic system pressure may make it desirable for personnel to work remotely.

The use of multiple cameras to take measurements at each of the four latch pin actuator (LPA) locations per wing at the same time presents a significant time savings over performing the same sequence four times per wing. Proper alignment between the two bores (clevis and lug) is required to assure minimization of the side loading introduced into the latch pin actuator (LPA) as the pin extends and locks the two surfaces. Side loading on the latch pin actuator (LPA) will reduce actuator life, increase hydraulic leakage, and result in in-service schedule interruptions. Adjustment of the structural end stop shims, in combination with the vision system, is used to assure that pins can extend, without side loading from structural interference or contact, at all four latch pin actuator (LPA) locations. The pins should never be extended while the vision system is installed.

The vision system itself has to meet strict size requirements to meet the minimal space inside of the wing tip latch line. There are multiple equipment installations including hydraulic tubing and whirling torque tubes which are part of the underlying Folding Wing Tip (FWT) actuation system. The Folding Wing Tip (FWT) Vision System is able to maintain a high resolution magnification and focus across a large depth of field. The system allows for measurement down to 0.001/0.002 inch offset between the latch pin and its respective moving lug by overlaying a sharp image of the pin surface and the scale reticle installed in the moving lug.

The vision system consists of a laptop, GigE cameras, 0.001 inch scale printed reticles, tunable drivers, USB hub, Ethernet hub, power over Ethernet (PoE) converters, USB cables, Hirose cables, and LED light packs. The diagram below assumes a two camera set up as used on the CSA-Lite test rig. The production equivalent is planned to utilize four cameras to minimize factory flow time, as opposed to multiple set ups and measuring activity for a single wing tip. Mounting hardware is also required to temporarily install the cameras and the reticles for measurement within the bores of the fixed clevis and moving lug, respectively.

There are two sets of mounting hardware per location. The scale reticle is installed in the bore of the moving lug. The camera mount is installed on the forward fixed lug, looking aft toward its latch pin actuator (LPA).

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An inspection system comprising:
    a remotely controllable imaging assembly including a camera and a lens system, wherein the lens system includes a tunable-focus lens and a magnifying lens between the camera and the tunable-focus lens; and
    a scale reticle positioned within a sight line of the camera of the imaging assembly such that the scale reticle is between the imaging assembly and a target.

2. The inspection system of claim 1 further comprising:
    a centering mount supporting the camera and lens system, wherein the centering mount is configured to attach the imaging assembly to a first component and center the imaging assembly relative to a bore of the first component.

3. The inspection system of claim 1 further comprising:
    a reticle mount configured to secure the scale reticle within a bore of a second component.

4. The inspection system of claim 1, wherein the imaging assembly is positioned such that the sight line of the camera is parallel to a floor of a manufacturing environment.

5. The inspection system of claim 1, wherein the imaging assembly is configured to fit within an envelope having maximum dimensions of 4.6 inch by 2 inch by 2 inch.

6. The inspection system of claim 1, wherein the imaging assembly is configured to provide 1 inch of tunable-focus in front of the target.

7. The inspection system of claim 1, wherein the imaging assembly is connected to a first component and the scale reticle is connected to a second component.

8. The inspection system of claim 7, wherein the first component is a fixed component and the second component is a moveable component.

9. The inspection system of claim 8, wherein the imaging assembly is configured to take an image of the scale reticle within the moveable component and an image of the target for measurement of an alignment of the target relative to the scale reticle.

10. The inspection system of claim 1, wherein the scale reticle has distance marks.

11. The inspection system of claim 1, wherein the target is associated with a pin configured to move through a bore of a movable lug and into a bore of a clevis.

12. An inspection system comprising:
a remotely controllable imaging assembly including a camera and a lens system, the imaging assembly configured to take an image of a target at a first focal plane of the lens system and take a second image of a scale reticle at a second focal plane of the lens system, wherein the imaging assembly is configured such that the second image of the scale reticle has a resolution of 0.001 inch when the scale reticle is between approximately 0.5 inches and approximately 6 inches from the imaging assembly and the scale reticle is up to an inch away from the target.

13. The inspection system of claim 12, wherein the imaging assembly is configured to fit within a confined space of less than 20 cubic inches.

14. A method comprising:
attaching a remotely controllable imaging assembly to a first component;
positioning a scale reticle within a sight line of a camera such that the scale reticle is between the imaging assembly and a target;
taking a first image of the target at a first focal plane of a lens system;
taking a second image of the scale reticle at a second focal plane of the lens system; and
measuring an alignment of the target relative to the scale reticle using the first image and the second image.

15. The method of claim 14, wherein the imaging assembly includes a camera and a lens system, wherein the lens system includes a tunable-focus lens and a magnifying lens between the camera and the tunable-focus lens.

16. The method of claim 15 further comprising:
remotely focusing the tunable-focus lens onto the scale reticle to change from the first focal plane of the lens system to the second focal plane of the lens system.

17. The method of claim 15 further comprising:
focusing the magnifying lens on the target to set the first focal plane.

18. The method of claim 14, wherein measuring the alignment of the target relative to the scale reticle comprises at least one of overlaying a portion of the second image onto the first image or overlaying data representative of the target within the second image onto the first image.

19. The method of claim 14 further comprising:
attaching the scale reticle to a bore of a movable lug, wherein attaching the imaging assembly of an inspection system to the first component comprises attaching the imaging assembly to a bore of a clevis, and wherein positioning the scale reticle of the inspection system within the sight line of the camera of the imaging assembly comprises positioning the movable lug such that the bore of the movable lug is substantially concentric with the bore of the clevis.

20. The method of claim 19, wherein the target is associated with a pin configured to move through the bore of the movable lug and into the bore of the clevis.

21. The method of claim 14, wherein positioning the scale reticle of an inspection system within the sight line of the camera of the imaging assembly is positioning the scale reticle between 0.5 inches and 6 inches from the imaging assembly.

* * * * *